US012230490B2

United States Patent
Warnke et al.

(10) Patent No.: US 12,230,490 B2
(45) Date of Patent: Feb. 18, 2025

(54) DEVICE, SYSTEM, AND METHOD FOR ION FRAGMENTATION BY USE OF AN ION MOBILITY DEVICE AND MESSENGER TAGGING

(71) Applicant: ECOLE POLYTECHNIQUE FEDERALE DE LAUSANNE (EPFL), Lausanne (CH)

(72) Inventors: Stephan Warnke, Préverenges (CH); Thomas Rizzo, Denens (CH); Ahmed Ben Faleh, Renens (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 28 days.

(21) Appl. No.: 17/709,446

(22) Filed: Mar. 31, 2022

(65) Prior Publication Data
US 2023/0317442 A1 Oct. 5, 2023

(51) Int. Cl.
*H01J 49/00* (2006.01)
*G01N 27/622* (2021.01)
*H01J 49/02* (2006.01)

(52) U.S. Cl.
CPC ........ *H01J 49/0045* (2013.01); *G01N 27/622* (2013.01); *H01J 49/0031* (2013.01); *H01J 49/022* (2013.01)

(58) Field of Classification Search
CPC .............. H01J 49/0095; H01J 49/0014; H01J 49/0031; H01J 49/0072; H01J 49/005
See application file for complete search history.

(56) References Cited

U.S. PATENT DOCUMENTS

| | | | |
|---|---|---|---|
| 6,469,296 B1 * | 10/2002 | Hansen | H01J 49/403 250/282 |
| 8,835,839 B1 | 9/2014 | Anderson et al. | |
| 9,401,267 B2 | 7/2016 | Johnson et al. | |
| 10,317,364 B2 | 6/2019 | Garimella et al. | |
| 10,522,337 B2 | 12/2019 | Rizzo et al. | |
| 11,984,309 B1 * | 5/2024 | Alberti | H01J 49/10 |
| 2009/0189064 A1 * | 7/2009 | Miller | G01N 27/624 250/281 |

(Continued)

FOREIGN PATENT DOCUMENTS

WO WO-2012106054 A2 * 8/2012 ........... G01N 27/622

OTHER PUBLICATIONS

Asmis, K. R., & Sauer, J. (2007). Mass-selective vibrational spectroscopy of vanadium oxide cluster ions. Mass spectrometry reviews, 26(4), 542-562.

(Continued)

*Primary Examiner* — David E Smith
*Assistant Examiner* — Hsien C Tsai
(74) *Attorney, Agent, or Firm* — Nixon & Vanderhye P.C.

(57) ABSTRACT

A device for fragmenting ions by collision induced dissociation, the device intended to be used together with a planar ion mobility apparatus, the device including a first conductive grid having a plurality of first openings, the first conductive grid configured for electric interconnection to a first electric potential, and a second conductive grid having a plurality of second openings, the second conductive grid configured for electric interconnection to a second electric potential, the first and second conductive grids being electrically insulated from each other.

13 Claims, 17 Drawing Sheets

(56) References Cited

U.S. PATENT DOCUMENTS

| | | | | |
|---|---|---|---|---|
| 2014/0224983 | A1* | 8/2014 | Chingin | H01J 49/0095 |
| | | | | 250/288 |
| 2015/0233866 | A1* | 8/2015 | Verenchikov | G01N 27/623 |
| | | | | 250/282 |
| 2019/0204272 | A1 | 7/2019 | Rizzo et al. | |
| 2020/0027713 | A1* | 1/2020 | Eiceman | H01J 49/0045 |
| 2021/0364467 | A1 | 11/2021 | DeBord et al. | |
| 2022/0185508 | A1* | 6/2022 | Lairson | B64G 1/66 |

OTHER PUBLICATIONS

Avela, H. F., & Sirén, H. (2020). Advances in lipidomics. Clinica Chimica Acta, 510, 123-141.

Bansal, P., Yatsyna, V., Abikhodr, A. H., Warnke, S., Ben Faleh, A., Yalovenko, N., . . . & Rizzo, T. R. (2020). Using SLIM-Based IMS-IMS Together with Cryogenic Infrared Spectroscopy for Glycan Analysis. Analytical chemistry, 92(13), 9079-9085.

Bohrer, B. C., Merenbloom, S. I., Koeniger, S. L., Hilderbrand, A. E., & Clemmer, D. E. (2008). Biomolecule analysis by ion mobility spectrometry. Annu. Rev. Anal. Chem., 1, 293-327.

Brümmer, M., Kaposta, C., Santambrogio, G., & Asmis, K. R. (2003). Formation and photodepletion of cluster ion-messenger atom complexes in a cold ion trap: Infrared spectroscopy of VO+, VO 2+, and VO 3+. The Journal of chemical physics, 119(24), 12700-12703.

Chao, A., Al-Ghoul, H., McEachran, A. D., Balabin, I., Transue, T., Cathey, T., . . . & Sobus, J. R. (2020). In silico MS/MS spectra for identifying unknowns: a critical examination using CFM-ID algorithms and ENTACT mixture samples. Analytical and bioanalytical chemistry, 412(6), 1303-1315.

Cismesia, A. P., Bell, M. R., Tesler, L. F., Alves, M., & Polfer, N. C. (2018). Infrared ion spectroscopy: an analytical tool for the study of metabolites. Analyst, 143(7), 1615-1623.

Coon, J. J., Syka, J. E., Shabanowitz, J., & Hunt, D. F. (2005). Tandem mass spectrometry for peptide and protein sequence analysis. Biotechniques, 38(4), 519-523.

Cui, L., Lu, H., & Lee, Y. H. (2018). Challenges and emergent solutions for LC-MS/MS based untargeted metabolomics in diseases. Mass Spectrometry Reviews, 37(6), 772-792.

De Vijlder, T., Valkenborg, D., Lemière, F., Romijn, E. P., Laukens, K., & Cuyckens, F. (2018). A tutorial in small molecule identification via electrospray ionization-mass spectrometry: The practical art of structural elucidation. Mass spectrometry reviews, 37(5), 607-629.

Dehmelt, H. G., & Jefferts, K. B. (1962). Alignment of the H 2+ Molecular Ion by Selective Photodissociation. I. Physical Review, 125(4), 1318.

Deng, L., Webb, I. K., Garimella, S. V., Hamid, A. M., Zheng, X., Norheim, R. V., . . . & Smith, R. D. (2017). Serpentine ultralong path with extended routing (SUPER) high resolution traveling wave ion mobility-MS using structures for lossless ion manipulations. Analytical chemistry, 89(8), 4628-4634.

Donohoo, K. B., Wang, J., Goli, M., Yu, A., Peng, W., Hakim, M. A., & Mechref, Y. (2021). Advances in mass spectrometry-based glycomics—An update covering the period 2017-2021. Electrophoresis, 43(1-2), 119-142.

Dunbar, R. C. (2000). Photodissociation of trapped ions. International Journal of Mass Spectrometry, 200(1-3), 571-589.

Duncan, M. A. (2000). Frontiers in the spectroscopy of mass-selected molecular ions. International Journal of Mass Spectrometry, 200(1-3), 545-569.

Flórez, A. I. G., Ahn, D. S., Gewinner, S., Schöllkopf, W., & von Helden, G. (2015). IR spectroscopy of protonated leu-enkephalin and its 18-crown-6 complex embedded in helium droplets. Physical Chemistry Chemical Physics, 17(34), 21902-21911.

Fridgen, T. D. (2009). Infrared consequence spectroscopy of gaseous protonated and metal ion cationized complexes. Mass spectrometry reviews, 28(4), 586-607.

Gerlich, D. (1992). Inhomogeneous rf fields: a versatile tool for the study of processes with slow ions. Advances in chemical physics, 82, 1-176.

Gerlich, D., & Borodi, G. (2009). Buffer gas cooling of polyatomic ions in rf multi-electrode traps. Faraday discussions, 142, 57-72.

Giles, K., Wildgoose, J. L., Langridge, D. J., & Campuzano, I. (2010). A method for direct measurement of ion mobilities using a travelling wave ion guide. International Journal of Mass Spectrometry, 298(1-3), 10-16.

Goebbert, D. J., Wende, T., Bergmann, R., Meijer, G., & Asmis, K. R. (2009). Messenger-tagging electrosprayed ions: Vibrational spectroscopy of suberate dianions. The Journal of Physical Chemistry A, 113(20), 5874-5880.

Hamid, A. M., Ibrahim, Y. M., Garimella, S. V., Webb, I. K., Deng, L., Chen, T. C., . . . & Smith, R. D. (2015). Characterization of traveling wave ion mobility separations in structures for lossless ion manipulations. Analytical chemistry, 87(22), 11301-11308.

Kamariotis, A., Boyarkin, O. V., Mercier, S. R., Beck, R. D., Bush, M. F., Williams, E. R., & Rizzo, T. R. (2006). Infrared spectroscopy of hydrated amino acids in the gas phase: protonated and lithiated valine. Journal of the American Chemical Society, 128(3), 905-916.

Lermyte, F. (Ed.). (2020). Advanced Fragmentation Methods in Biomolecular Mass Spectrometry (vol. 9). Royal Society of Chemistry. (Book abstract & contentt).

Liew, C. Y., Yen, C. C., Chen, J. L., Tsai, S. T., Pawar, S., Wu, C. Y., & Ni, C. K. (2021). Structural identification of N-glycan isomers using logically derived sequence tandem mass spectrometry. Communications Chemistry, 4(1), 1-11.

Masson, A., Williams, E. R., & Rizzo, T. R. (2015). Molecular hydrogen messengers can lead to structural infidelity: A cautionary tale of protonated glycine. The Journal of Chemical Physics, 143(10), 104313.

Merenbloom, S. I., Koeniger, S. L., Valentine, S. J., Plasencia, M. D., & Clemmer, D. E. (2006). IMS-IMS and IMS-IMS-IMS/MS for separating peptide and protein fragment ions. Analytical Chemistry, 78(8), 2802-2809.

Okumura, M., Yeh, L. I., Myers, J. D., & Lee, Y. T. (1986). Infrared spectra of the cluster ions H7O+ 3 H2 and H9O+ 4 H2. The Journal of chemical physics, 85(4), 2328-2329.

Ollivier, S., Tarquis, L., Fanuel, M., Li, A., Durand, J., Laville, E., . . . & Rogniaux, H. (2021). Anomeric Retention of Carbohydrates in Multistage Cyclic Ion Mobility (IMS n): De Novo Structural Elucidation of Enzymatically Produced Mannosides. Analytical Chemistry, 93(15), 6254-6261.

Oomens, J., Sartakov, B. G., Meijer, G., & Von Helden, G. (2006). Gas-phase infrared multiple photon dissociation spectroscopy of mass-selected molecular ions. International Journal of Mass Spectrometry, 254(1-2), 1-19.

Peterson, T. L., & Nagy, G. (2021). Toward Sequencing the Human Milk Glycome: High-Resolution Cyclic Ion Mobility Separations of Core Human Milk Oligosaccharide Building Blocks. Analytical Chemistry, 93(27), 9397-9407.

Polfer, N. C., & Oomens, J. (2009). Vibrational spectroscopy of bare and solvated ionic complexes of biological relevance. Mass spectrometry reviews, 28(3), 468-494.

Robertson, W. H., & Johnson, M. A. (2003). Molecular aspects of halide ion hydration: The cluster approach. Annual review of physical chemistry, 54(1), 173-213.

Tolmachev, A. V., Vilkov, A. N., Bogdanov, B., Păsa-Tolić, L., Masselon, C. D., & Smith, R. D. (2004). Collisional activation of ions in RF ion traps and ion guides: The effective ion temperature treatment. Journal of the American Society for Mass Spectrometry, 15(11), 1616-1628.

Vidova, V., & Spacil, Z. (2017). A review on mass spectrometry-based quantitative proteomics: Targeted and data independent acquisition. Analytica chimica acta, 964, 7-23.

von Helden, G., van Heijnsbergen, D., & Meijer, G. (2003). Resonant ionization using IR light: A new tool to study the spectroscopy and dynamics of gas-phase molecules and clusters. The Journal of Physical Chemistry A, 107(11), 1671-1688.

Warnke, S., Ben Faleh, A., & Rizzo, T. R. (2021). Toward High-Throughput Cryogenic IR Fingerprinting of Mobility-Separated Glycan Isomers. ACS measurement science Au, 1(3), 157-164.

(56) References Cited

OTHER PUBLICATIONS

Abikhodr, A. H., Yatsyna, V., Ben Faleh, A., Warnke, S., & Rizzo, T. R. (2021). Identifying Mixtures of Isomeric Human Milk Oligosaccharides by the Decomposition of IR Spectral Fingerprints. Analytical chemistry, 93(44), 14730-14736.

Bansal, P., Faleh, A. B., Warnke, S., & Rizzo, T. R. (2022). Identification of N-glycan positional isomers by combining IMS and vibrational fingerprinting of structurally determinant CID fragments. Analyst, 147, 704-711.

Ben Faleh, A. (2021). A gas phase approach for glycan analysis: Combining ultrahigh-resolution ion mobility spectrometry with cryogenic vibrational spectroscopy (No. 8605 Thesis). EPFL.

Dyukova, I., Faleh, A. B., Warnke, S., Yalovenko, N., Yatsyna, V., Bansal, P., & Rizzo, T. R. (2021). A new approach for identifying positional isomers of glycans cleaved from monoclonal antibodies. Analyst, 146(15), 4789-4795.

Pellegrinelli, R. P. (2021). Combining cryognic ion spectroscopy with ion mobility for the study of glycan fragmentation (No. 8916 Thesis). EPFL.

Warnke, S., Ben Faleh, A., Scutelnic, V., & Rizzo, T. R. (2019). Separation and identification of glycan anomers using ultrahigh-resolution ion-mobility spectrometry and cryogenic ion spectroscopy. Journal of the American Society for Mass Spectrometry, 30(11), 2204-2211.

Yatsyna, V., Abikhodr, A. H., Ben Faleh, A., Warnke, S., & Rizzo, T. R. (2022). High-Throughput Multiplexed Infrared Spectroscopy of Ion Mobility-Separated Species Using Hadamard Transform. Analytical chemistry, 94(6), 2912-2917.

\* cited by examiner

Travelling wave potential

Lacto-N-tetraose (LNT)

Possible implementation with hexapole geometry

Side-view of hexapole geometry

DEVICE, SYSTEM, AND METHOD FOR ION FRAGMENTATION BY USE OF AN ION MOBILITY DEVICE AND MESSENGER TAGGING

FIELD OF THE INVENTION

The present patent application is directed to ion mobility separation and fragmentation, and related ion manipulations, and also related to spectral analysis of ion fragments, and isomer identification. More specifically, the present patent application is directed to devices, systems, and method for performing ion fragmentation. Moreover, the present invention is also directed to the field of gas-phase ion spectroscopy and more specifically to cryogenic messenger-tagging spectroscopy that can be applied, for example, to obtain infrared (IR) vibrational spectra of mass-to-charge selected molecular ions.

BACKGROUND

The ability to create fragments of selected molecular ions inside of a mass spectrometer is central to many established workflows in all the "omics" fields to identify unknown molecular structures. The commonly applied strategy is to generate fragments or fragmentation patterns that are characteristic for the precursor molecular structure. Fragmentation mass spectra can then be compared to database fragment spectra for identification of the parent compound. If fragment libraries do not contain information about the compound to be identified, a comparison of experimental data with in-silico generated fragment spectra can sometimes aid identification.

Fragments generated inside of the ion source by various mechanisms can yield structure-unspecific fragmentation patterns, especially when a broad mixture of analytes is present. Therefore, parent molecules in question are often pre-selected, most commonly by mass spectrometry (MS), followed by fragmentation and MS analysis of the fragments, commonly referred to as tandem MS or MS-MS. If isobaric or isomeric analyte molecules are present, the fragmentation step needs to be preceded by a separation step, either before ionization in the condensed phase using, for example, liquid chromatography (LC), or in the gas phase using, for example, ion mobility spectrometry (IMS), which can separate ions of different size-to-charge ratio. Isobaric or isomeric fragments produced from a specific precursor ion are most commonly analyzed in $MS^n$ type experiments, where further fragment generations of selected fragment species are produced in an attempt to generate isomer-specific fragmentation patterns, which ultimately can help to deduce the structure of the parent molecule. Alternatively, isomeric fragments of the first generation can undergo further ion-mobility separation, and information about their molecular identity can, for example, be deduced from drift-time measurements or other isomer/isobar-specific detection schemes. Compared to $MS^n$ identification schemes, this has the advantage that it involves a more direct measurement of molecular properties and a less complicated data evaluation process.

One possible implementation of such an IMS-IMS approach is a successive arrangement of ion-mobility devices with ion fragmentation capabilities in-between. However, instruments using such a linear arrangement are typically limited in IMS resolution and require the incorporation of an additional IMS separation region for every fragment generation. Therefore, they can become comparatively large and impractical in an analytical setting. A much more compact IMS solution is given by so-called structures for lossless ion manipulation (SLIM), which allows ions to be mobility separated on an extended pathlength by routing them through a serpentine drift path, created by electrodes on a pair of printed circuit boards (PCBs), held at a distance of a few millimeters. Most importantly, SLIM technology allows to route ions back to the beginning of the IMS separation region after they completed a separation cycle, hence enabling cyclic IMS. An ion fragmentation technique incorporated in a cyclic IMS device therefore allows to perform IMS type experiments, where IMS separation cycles can be applied to any generation of precursor and fragment ions produced inside the IMS device. The utility of such IMS approaches has recently been demonstrated on isomeric oligosaccharides, for example. Recently, it has been shown how an n-th fragment ion generation can be further investigated using mass-spectrometry based methods, specifically using gas-phase (cryogenic) infrared (IR) spectroscopy. The addition of an IR spectroscopic dimension to $IMS^n$-MS data is particularly advantageous because a cryogenic IR spectrum represents an intrinsic molecular fingerprint and can be used for unambiguous identification of molecular ions and their fragments.

Different types of planar ion mobility apparatuses have been described by the state of the art, for example U.S. Pat. Nos. 8,835,839, 10,317,364, and United States Patent Publication No. 2021/0364467, all of these three (3) references herewith incorporated by reference in their entirety, as a non-limiting example of a planar ion mobility apparatus a traveling wave-based SLIM device for ion mobility separations.

A variety of dissociation techniques for ions have been applied inside of mass-spectrometer type instruments including collision-induced dissociation (CID), photon-induced dissociation using light in the infrared (IR) as well as in the ultraviolet (UV) wavelength range, surface-induced dissociation (SID), and electron-based methods. Of all the techniques available, CID is most commonly applied because of its relatively simple technical implementation and its ability to generate information-rich fragment mass spectra of positively as well as negatively charged molecular ions. The CID process is most efficient in a low-pressure ($<10^{-2}$ mbar) region of a mass spectrometer instrument, where the mean-free-path of an ion is long enough to accelerate it to sufficiently high kinetic energies (typically several eV) before a collision with a buffer gas atom or molecule occurs. This can be achieved by applying a few tens of volts DC potential difference between two acceleration electrodes. However, IMS devices are typically operated with buffer gas pressures in the mbar regime, which makes the acceleration of an ion to sufficiently high kinetic energies technically more challenging. Specifically, the rate of high-energy collisions that contribute to the CID process needs to exceed that of the random Brownian motion to avoid collisional cooling and therefore a quenching of the CID process. In other words, the ion "heating" rate needs to be larger than the "cooling" rate. This can be achieved by a large DC potential difference between electrodes inside the IMS region. However, depending on the specific electrode design and arrangement, the strength of the electric field resulting from a potential difference between two electrodes can be orders of magnitude lower in the region of the ion path, far away from the electrodes, than it is directly between the electrodes. For example, high DC potentials need to be applied to these electrodes to compensate for this effect and to create sufficiently high electric field strength to accelerate the ions. However, compared to conditions in low-pressure regions of an MS instrument, electrical voltage breakdown can limit the maximum voltage difference that can be applied between adjacent electrodes, and potentially damage hardware and electrical power supplies.

Accordingly, in light of these deficiencies of the state of the art in the field of CID and the use with SLIM devices, or other types of planar ion mobility devices, substantially improved CID devices and methods are desired, for improved fragmentation yields and performance.

Moreover, in the field of mass spectrometry (MS) widespread applications are found in all areas of the life sciences, environmental monitoring, and security. However, not many techniques exist to directly probe molecular structure inside a mass spectrometer. Such a measurement would benefit from the gas-phase environment of a mass spectrometer, where molecular ions can be isolated, free from interaction with the surroundings, and detected with high sensitivity. Great structural details can be obtained when absorption spectra of mass-to-charge selected molecules are measured. First experiments of mass-selective spectral measurements of ions date back to 1962, but it was only in the last two decades that instruments for ultraviolet (UV) and infrared (IR) spectral measurements for larger molecular ions have been developed. Molecular vibrations are probed in the IR wavelength range, and an IR spectrum of an isolated molecule contains information about the positions and interaction of functional groups within the molecule. The frequencies and intensities of molecular vibrational bands are dictated by quantum mechanics and represent as such an intrinsic molecular property, much like its mass, for example. This is a distinction from other molecular metrics that can be determined experimentally, such as the ion mobility or fragmentation propensities, etc., because as an intrinsic molecular property, an IR spectrum represents a molecular fingerprint that can be highly sensitive to smallest structural details. When measured accurately, such a fingerprint spectrum can be used to determine the precise structure of a molecular ion in conjunction with computational methods, or it can be stored in a database to allow an unambiguous identification of a molecule in a future encounter.

As opposed to the direct absorption of light that can be measured for molecules in the condensed phase or for neutral gas-phase molecules, such measurements performed on ions are challenging because their number densities inside an MS instrument are orders of magnitude lower than those of their neutral or condensed-phase equivalents. Instead, an IR spectroscopic technique implemented in an MS instrument relies on a change in m/z that occurs after irradiation of an ion (i.e., the dissociation of bonds and the formation of fragments that can be detected). Infrared multiple photon dissociation (IRMPD) is such an 'action spectroscopic' scheme, where multiple consecutive photon absorption events gradually increase the internal temperature of an ion or ion complex until the weakest bonds dissociate, and the wavelength-dependent dissociation yield gives an IRMPD spectrum. However, IRMPD spectral measurements with resolved absorption lines are typically limited to relatively small molecules. This is because at room temperature, a dynamically interchanging ensemble of structures is typically probed where the spectrum of each structure contributes to the measured spectrum. In addition, an harmonic red-shifting and broadening effects, inherent to the multiple-photon process, further impedes the measurement of narrow absorption lines. When ions are cryogenically cooled before photon absorption, the number or interchanging structures can be reduced, which leads to the measurement of narrower spectral features, and further increase in spectral resolution can be achieved when the spectroscopic scheme is carried out in the single-photon absorption regime. One technique to achieve the latter is called the messenger-tagging technique, which dates back to 1985 where first experiments on $H_2$ tagged ion clusters were made. See Okumura et al., "Infrared spectra of the cluster ions H7O+3·H2 and H9O+4·H2," The Journal of Chemical Physics, Vol. 85, No. 4, year 1986, pages 2328-2329.

In messenger tagging, a weakly bound mass-messenger is used as an indicator for photon absorption. Ideally, a messenger tag is chosen that does not or only very weakly influences the ion structure and that requires only the energy absorbed from a single photon to dissociate from the analyte ion. The resulting IR spectra can be of high spectral resolution because of the low initial internal temperature of the ion in question and because broadening mechanisms associated with multiple photon absorption are avoided.

The basic principle of the messenger-tagging technique is as follows: Ions are brought into the high-vacuum region of a mass spectrometer, where they are injected into an ion trap, which is held at cryogenic temperatures. A cold, inert buffer gas, typically helium, is present at a low pressure when the ions arrive, leading to ion-buffer gas collisions, energy transfer from the ion to the buffer gas, and therefore to reduction of the internal energy and cooling of the ion. Both continuous flows and pulsed buffer gas sources have been successfully applied. Atoms or molecules representing the messenger tags are also present in the inert buffer gas, and three-body-collisions between the ion, the messenger, and a third collision partner can lead to the formation of ion-messenger clusters when the internal vibrational energy of the ion is low enough to allow for the weak charge-induced dipole interaction to form a stable bond. As a result, messenger-tagged ions are formed, which can be observed as additional signals in the mass spectrum after the content of the trap has been emptied toward the mass analyzer. Such a mass spectrum is shown in FIG. 8 in the example of singly charged disaccharide molecular ions that were complexed with nitrogen molecules inside a cryogenic multipole trap.

Each additional nitrogen molecule leads to the observation of a mass signal with a +28 mass shift ($N_2$ mass). The observed cluster size distribution is a result of the average temperature of the ions inside the ion trap, the binding energy of each additional messenger-tag molecule, and different mechanisms leading to collisions with residual gas molecules and a possible loss of messenger tags after they have been formed. The latter can occur in the process of transfer of the ion ensemble from the cryogenic trap to the mass spectrometer or by radiofrequency-induced heating of ions inside the ion trap, which will be discussed further below. To obtain an IR spectrum, the ensemble of ions is irradiated with IR photons of a specific wavelength, and the depletion of messenger-tagged ions as well as the increase in abundance of untagged ions is monitored by subsequent m/z analysis. The photon flux should be low enough to avoid IRMPD to occur (i.e., the only 'fragments' that should be observed are the bare, untagged ions). A full spectrum can then be obtained by plotting the ion-messenger tag cluster dissociation yield Y as a function of the laser wavelength λ as Equation (1) shown below:

$$Y(\lambda) = \frac{\sum_t I_t(\lambda)}{I_u(\lambda) + \sum_t I_t(\lambda)} \quad \text{Equation (1)}$$

where $I_u$ represents the intensity of the untagged or bare ion, and $I_t$ represents the intensity of the individual tagged species.

To fully exploit the potential of messenger-tagging spectroscopy, the ion-messenger tag interaction should be strong enough to 'survive' the conditions inside the mass spectrometer for the time of the experiment but weak enough for the energy of a single photon to increase the internal vibrational energy of the tagged ion above the dissociation threshold. In addition to various noble gases (helium, neon, argon, krypton, xenon), other gases like hydrogen, helium, nitrogen, different carbon-oxides, methane, or sulfur hexafluoride have been suggested as messenger tags for ion IR spectroscopy. In addition, different solvent molecule adducts, such as acetonitrile, have been utilized in a similar manner.

An IR spectrum of an ion acquired using the messenger-tagging technique represents the spectrum of the messenger-tagged ion, as opposed to the bare ion. Therefore, a possible influence of the messenger molecule(s) on the molecular structure of the ion should be considered, and while the influence of a single messenger tag on the molecular structure may be negligible, multiple tags interacting with the ion may cause structural changes, which will lead to changes in the IR spectrum, with respect to the spectrum of the bare ion. This is especially undesirable if the experimental spectrum serves as a structural probe for comparison with calculated vibrational spectra, because the messenger tag is often not taken into account during these calculations. However, when the experimental spectrum serves as a molecular fingerprint that is compared to a previously recorded database, then the possibly structure-altering messenger tags are not as worrisome, as long as the database spectrum was acquired with the same number of tags attached to the ion. Either way, a means to control the amount of tagging observed in the experiment is desirable to avoid such complications. For simplicity and reproducibility, tagging spectroscopy is usually performed under conditions in which singly tagged species are mainly observed, together with the bare, untagged ion. Throughout the literature, the amount of tagging has been controlled by application of the following methods (i) to (iv):

(i) Variation of the cryogenic trap temperature: The temperature of the trap influences the temperature of the initial buffer gas for trapping and cooling of the incoming ions and hence has a direct influence on the ultimate internal vibrational energy of the analyte ions. This, in turn, influences the propensity for the ions to tag;

(ii) Buffer gas pressure: The buffer-gas pressure or density ('initial' buffer gas density in case of pulsed buffer gas sources) influences the collision rate and therefore the cooling rate of incoming ions. This can influence the ultimate internal temperature of the ion and therefore the tagging propensity that can be achieved. Additionally, a lower buffer-gas number density will provide fewer collision partners for the three-body collisions necessary to form a tagged ion;

(iii) Buffer/tagging gas composition: The number density of the messenger-tagged species (i.e. the gas composition that is introduced into the cryogenic trap) will directly influence the number of messenger tags that are available to tag the ions; and (iv) Selection of the messenger tag: Different messenger-tag species have different interaction with the analyte ions because of their different polarizabilities and sizes. For example, at the same temperature and gas pressures, helium-tagged ions would be less abundant than hydrogen-tagged ions.

The effect of the temperature of the cryogenic trap on the tagging yield is illustrated in FIGS. 9A and 9B. FIG. 9A shows time-of-flight mass spectra of disaccharide molecular ions (singly sodiated) after being trapped for several tens of milliseconds inside a cryogenic ion trap held at different temperatures under constant tagging and buffer gas conditions. FIG. 9B displays the tagging yield according to Equation (1) as a function of temperature, determined from the mass spectra in FIG. 9A. The decline in tagging yield at higher temperature is apparent.

As shown above, the current devices, systems and methods for messenger tagging rely on changes to different parameters and settings of an ion trap, for example the change of the trap temperature, change of the gas flow, or the change of the gas composition, which are relatively slow processes requiring complex control, to change a certain degree of tagging of the ions for the observations. See for example U.S. Pat. No. 9,401,267, this reference herewith incorporated by reference in its entirety. Another system in the field of messenger tagging of ions in the field of glycan analysis and molecular biology is shown in U.S. Pat. No. 10,522,337, this reference herewith incorporated by reference in its entirety.

However, these state of the art methodologies for messenger tagging have a very slow response time, and thereby prohibit many different applications and analyses in the field of messenger tagging of ions. Also, when different types of analyte ions are investigated within a short time, it is undesirable to apply a method for tagging control that represents a bottleneck in the analysis workflow. However, none of the methods described above can be implemented to yield instantaneous results, as they either require some period of stabilization of temperature or pressure or physical modification of the instrument.

Therefore, there is a strong need for substantially improved methods, systems, and devices for messenger tagging of ions, for example to be able to perform a rapid change of the parameters, and thereby also allowing for sophisticated control methods not contemplated by the state of the art.

SUMMARY

According to one aspect of the present invention, a device for fragmenting ions by collision induced dissociation is provided, the device intended to be used together with a planar ion mobility apparatus having two parallel surfaces for ion motion. Preferably, the device includes a first conductive grid having a plurality of first openings, the first conductive grid configured for electric interconnection to a first electric potential, and a second conductive grid having a plurality of second openings, the second conductive grid configured for electric interconnection to a second electric potential, the first and second conductive grids being electrically insulated from each other.

According to another aspect of the present invention, a method for operating a device for fragmenting ions by collision is provided. Preferably the method includes the steps of generating ions with an ionization source, causing ion motion with a planar ion mobility apparatus and performing ion separation in a separation region of the ion mobility apparatus, providing a first and second electric potential to first and second conductive grids, respectively, with an electric power source, the first and second electric potential being different, passing separated ions from the separation region of the ion mobility apparatus through the first and second conductive grids, respectively, to cause collision induced dissociation of at least some of the separated ions to cause fragmented ion parts, causing further ion mobility separation of the fragments on the planar ion mobility apparatus, and analyzing the fragmented ion parts with at least one of a spectrometer or a charge detector.

According to yet another aspect of the present invention, a system for fragmenting ions by collision and analyzing the fragmented ions is provided. Preferably, the system includes an ionization source configured to generate ions, a planar ion mobility apparatus configured to provide for ion motion and ion separation in a separation region, a grid assembly including first and second conductive grids, the grid assembly arranged downstream relative to the ion motion from the separation region of the ion mobility apparatus, the grid assembly configured to cause collision induced dissociation of at least some of the separated ions to cause fragmented ion parts, and at least one of a charge detector or a spectrometer for analyzing the fragmented ion parts or a charge detector for detecting charges.

According to still another aspect of the present invention, a ion tagging system is provided, preferably including an ion source for generating ions, an ion transfer device for providing motion to the generated ions, a cryogenic ion trap for receiving the generated ions from the ion transfer device, the cryogenic ion trapped configured to messenger-tag the generated ions, the cryogenic ion trap including RF electrode assembly and DC electrode assembly, a laser device configured to irradiate the messenger-tagged ions, a mass spectrometer for analyzing the irradiated ions, and a controller for controlling a voltage that is applied to the DC electrode assembly, the voltage configured to move a position of an ion cloud of the messenger-tagged and trapped ions relative to the RF electrode assembly, to thereby change an amount of RF heating induced into the ion cloud and to control an average number of messenger tags attached to ions of the ion cloud.

Moreover, preferably, the laser device of the ion tagging system is configured to at least one of irradiate the messenger-tagged ions that reside inside the cryogenic ion trap, and/or that have exited the cryogenic ion trap.

In addition, preferably, the ion source of the ion tagging system is configured to generate the ions by at least one of electrospray ionization (ESI), proton transfer reaction (PTR), plasma ionization, matrix-assisted laser desorption/ionization (MALDI), atmospheric pressure chemical ionization (APCI), atmospheric pressure photoionization (APPI), electron ionization (EI), or chemical ionization (CI).

Furthermore, the cryogenic ion trap of the ion tagging system includes a channel defining an axis of longitudinal extension in which the ion cloud is formed, the RF electrode assembly includes first and second RF electrodes, the first and second RF electrodes opposing each other with the channel arranged in-between, the DC electrode assembly including a first and second DC electrodes, the first and second DC electrodes opposing each other with the channel arranged in-between, and arranged transversal to the first and second RF electrodes.

In addition, the first and second DC electrodes of the DC electrode assembly of the cryogenic ion trap each include electrode segments, the segments arranged adjacent to each other along a direction of the axis of longitudinal extension, wherein the controller is configured to apply different voltages to the different segments along the direction to establish a DC potential gradient with the DC electrode assembly along the axis of longitudinal extension.

Moreover, the potential gradient can be such that a DC voltage of the electrode segments at an influx side of the channel is larger than a DC voltage of the electrode segments at the outflux side of the channel, and gradually decreases from the influx side to the outflux side when positive ions are being transmitted and with reversed DC voltages when negative ions are being transmitted. Furthermore, a gas-conductance limiting Einzel lens or a conventional single-plate ion lens is arranged at an influx side and at an outflux side of the channel of the cryogenic ion trap.

In addition, the cryogenic ion trap is preferably made as a sandwich construction, the sandwich construction including a lower thermally conductive plate, a lower printed circuit board having the first RF electrodes, the channel defined by two sidewalls having the first and second DC electrodes, respectively, an upper printed circuit board having the second RF electrodes, and an upper thermally conductive plate. Moreover, preferably, at least one of the lower or upper printed circuit board includes wirings and contacts to electrically interconnect the controller to the first and second DC electrodes. Furthermore, each side wall of the cryogenic ion trap can be formed by segments of the first or the second DC electrodes, the segments electrically separated from each other.

In addition, according to still another aspect of the present invention, a cryogenic ion trap for receiving ions from an ion generation and transfer device is provided. Preferably, the cryogenic ion trap configured to messenger-tag the generated ions, the cryogenic ion trap including RF electrode assembly and DC electrode assembly, the cryogenic ion trap preferably including a channel defining an axis of longitudinal extension in which an ion cloud is formed, the RF electrode assembly includes first and second RF electrodes, the first and second RF electrodes opposing each other with the channel arranged in-between, the DC electrode assembly including a first and second DC electrodes, the first and second DC electrodes opposing each other with the channel arranged in-between, and arranged transversal to the first and second RF electrodes.

Moreover, preferably, the first or the second DC electrodes of the DC electrode assembly each include a plurality of electrode segments arranged along an axis of longitudinal extension that are electrically separated from each other. In addition, preferably, the first or the second RF electrodes each include a plurality of RF electrode rows that extend in a longitudinal direction of the ion trap, and a DC electrode pad array interspersed between the rows of RF electrode rows.

Furthermore, according to another aspect of the present invention, a method for controlling messenger tagging of ions is provided. Preferably, the method includes the steps of generating ions with an ionization source, trapping the generated ions in a cryogenic ion trap, the cryogenic ion trap including an ion channel, and at least one of a RF electrode assembly with the ion channel arranged between RF electrodes of the RF electrode assembly, and/or a DC electrode assembly with the ion channel arranged between DC electrodes of the DC electrode assembly, tagging at least some ions in the cryogenic ion trap with an inert buffer gas, moving the tagged and untagged ions into a detection region of a mass spectrometer and analyzing the ions to detect a mass-to-charge ratio of the ions, determining a tagging yield of the ions in the detection region and comparing the tagging yield with a predefined comparison value with a data processor, and controlling at least one of a voltage applied to the DC electrodes of the DC electrode assembly and/or a voltage applied to the RF electrodes of the RF electrode assembly of the cryogenic ion trap to change the tagging yield of the ions. In a variant, the step of trapping and controlling is performed with a bias voltage that is applied to at least one of the electrodes of the RF electrode assembly.

In addition, the method preferably further comprises the step of redetermining a tagging yield of the ions in the detection region and comparing the tagging yield with a comparison value with a data processor, after the step of controlling the voltage. Furthermore, in the step of controlling the voltage, preferably a voltage difference between the DC electrodes of the DC electrode assembly and a DC bias voltage of the RF electrodes is increased, when the step of determining the tagging yield indicates that the tagging yield is higher than the predefined comparison value, and the voltage difference between the DC electrodes of the DC electrode assembly and the DC bias voltage of the RF electrodes is decreased when the step of determining the tagging yield indicates that the tagging yield is lower than the predefined comparison vale.

Moreover, in a variant, a tagging control parameter of the cryogenic ion trap and method for controlling messenger tagging is represented by a DC bias voltage difference applied to at least one DC or RF electrode with respect to the DC level of neighboring electrodes in the ion trap assembly.

The above and other objects, features and advantages of the present invention and the manner of realizing them will become more apparent, and the invention itself will best be understood from a study of the following description with reference to the attached drawings showing some preferred embodiments of the invention.

BRIEF DESCRIPTION OF THE SEVERAL VIEWS OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 5B shows a typical arrangement of the electrodes of a SLIM device including electrodes carrying a radiofrequency RF alternating electrical potential, DC guard electrodes, and electrodes carrying a travelling waveform (TW) electrical potential, FIG. 5C showing an exemplary implementation of a square travelling-wave potential, and in this example, the travelling wave is here defined on a repeating pattern of eight (8) electrodes, and FIG. 5D showing a 3-dimensional view of the travelling-wave potential at one instant in time;

FIGS. 15A and 15B showing results of the herein presented cryogenic ion trap 400 with a DC electrode assembly 410 for comparison with the results of the state-of-the-art cryogenic ion trap as shown in FIGS. 9A and 9B, in which FIG. 15A shows time-of-flight mass spectra of singly sodiated disaccharide molecular ions complexed with different amount of $N_2$ messenger-tag molecules inside a cryogenic ion trap 400 with the DC electrode assembly 410 to induce controlled radiofrequency heating for tagging control, and FIG. 15B showing the tagging yield as a function of DC voltage to demonstrate effective tagging control.

Herein, identical reference numerals are used, where possible, to designate identical elements that are common to the figures. Also, the representations in the figures are simplified for illustration purposes and may not be depicted to scale.

DETAILED DESCRIPTION OF THE EMBODIMENTS

Figure 1A:
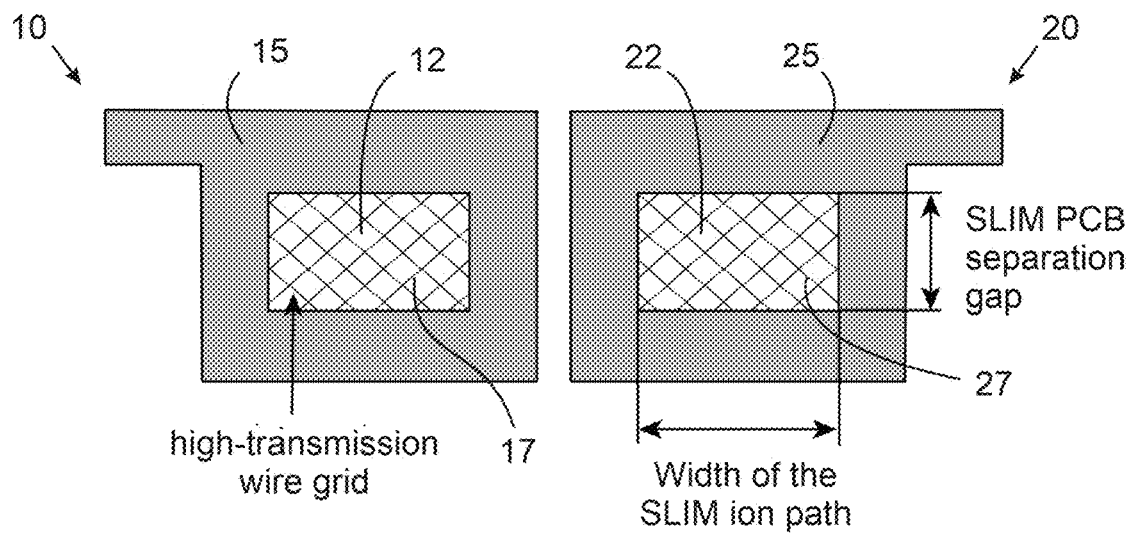
FIGS. 1A and 1B show visualizations of an exemplary embodiment of a device for fragmenting ions by collision induced dissociation (CID) 100, having a dual wire-grid assembly with two wire-grid elements, with FIG. 1A showing a first and second conductive grid 10, 20 arranged next to each other for illustration purposes, a first and second conductive frames 15, 25 holding the first and second conductive grids 10, 20, respectively, for example made of a metal, and FIG. 1B showing a perspective view of the device for fragmenting ions by CID 100 showing a dual wire-grid assembly, with an insulating, distance-defining spacer 30 having an open window in-between the first and second conductive grids.
Figure 1B:
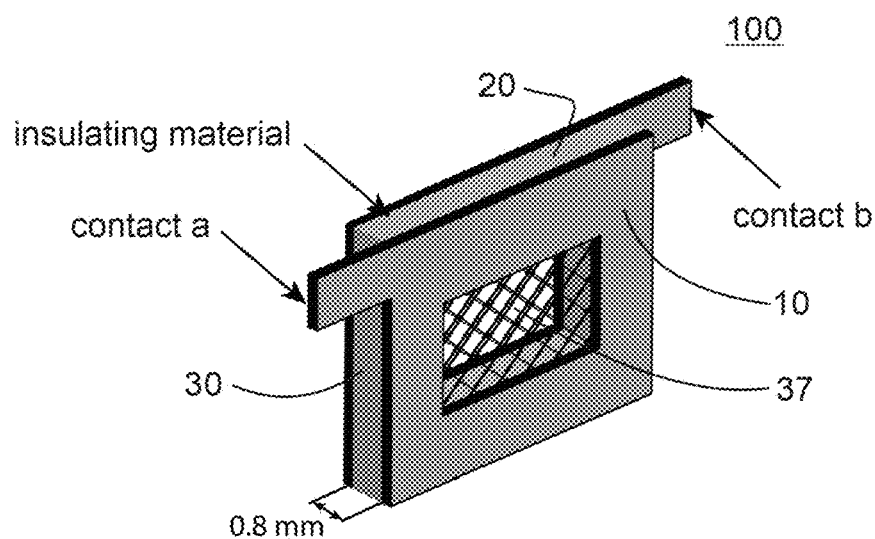
Figure 3:
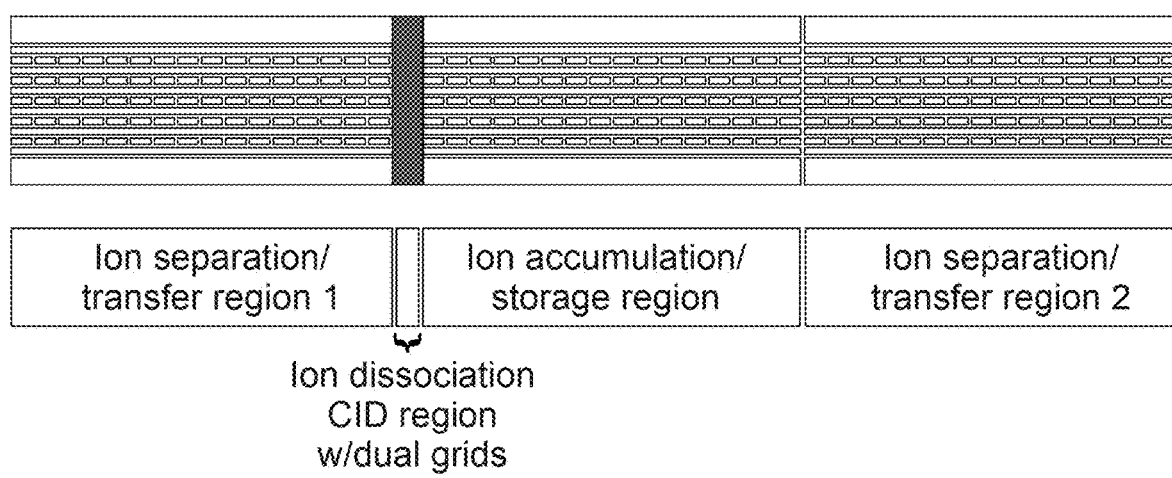
FIG. 3 shows an exemplary and schematic visualization of an electrode pattern for a SLIM device 200 with dedicated regions for ion separation, ion dissociation, fragment/parent ion storage, and fragment/parent transport or separation after ion release from the storage region.
Figure 4A:
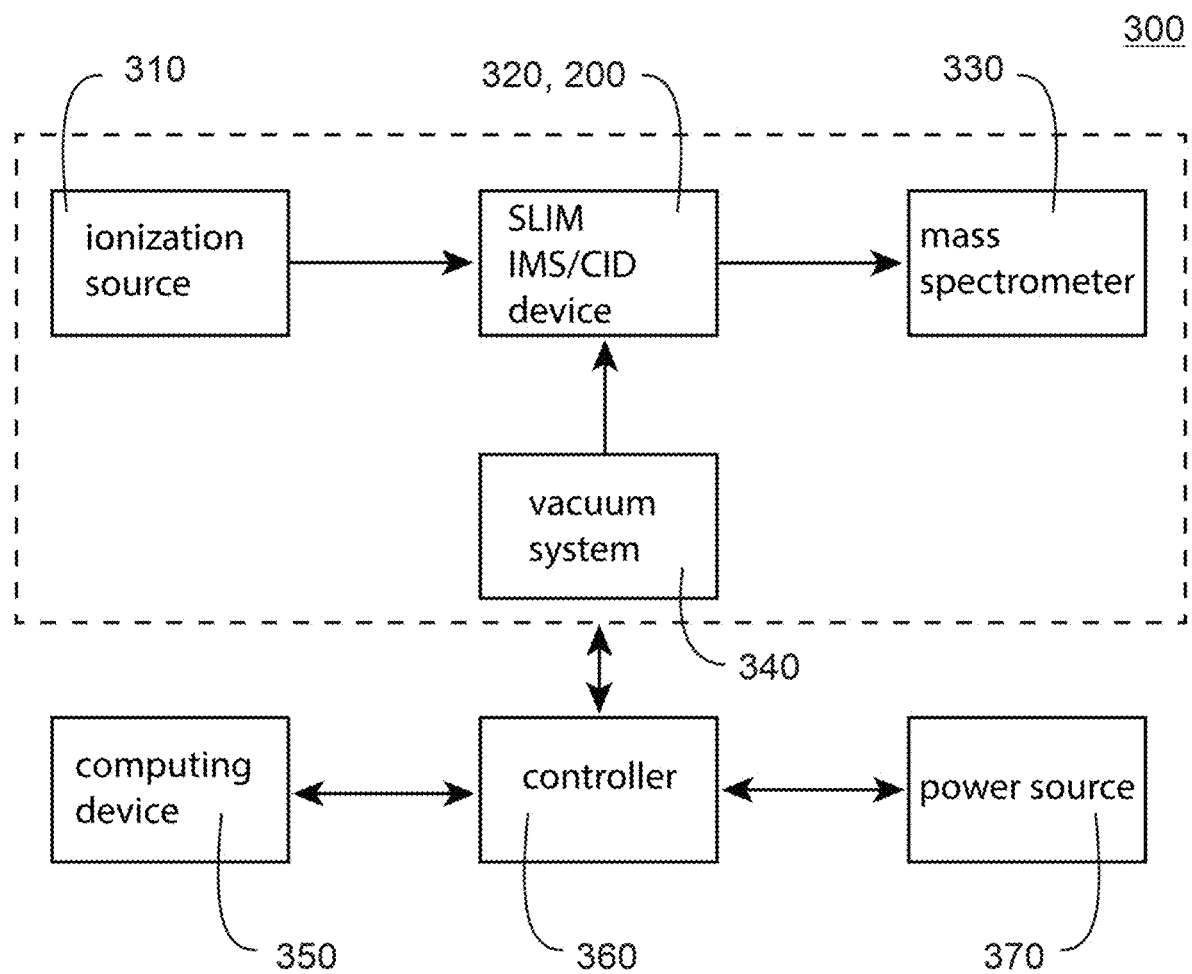
FIGS. 4A and 4B shows some aspects related to a ion-mobility device or system 300 having a CID device 100, with FIG. 4A showing an exemplary and schematic view of an ion-mobility device or system 300 that can perform ion mobility spectrometry (IMS) experiments and measurements, for example n-times cyclically repeated ion mobility spectrometry (IMS") experiments and measurements, and FIG. 4B showing an exemplary arrangement of the CID device 100 preceding an ion mobility separation region 1, and followed by an ion accumulation/storage region in an upper section of the figure, and illustrates the TW and DC offset potentials applied to the different regions and the CID device 100 that can be generated by a power source 370 and can be controlled by controller 360 while performing fragmentation and accumulating positively charged ions (i), and reinjection of fragments and parent ions into the second separation region ((ii) and (iii)) for one instant in time.

According to an aspect of the present invention, a device for fragmenting ions by CID 100 is provided, having first and second conductive grids 10, 20, as exemplarily illustrated in FIGS. 1A and 1B, for interconnection and operation with a planar ion mobility apparatus, for example the SLIM device 200 described herein. Moreover, according to another aspect of the present invention, a SLIM device 200 including a device for fragmenting ions by CID 100 is provided, as exemplarily illustrated in FIGS. 2A, 2B, and 3, and a system 300 for fragmenting ions by collision and analyzing the fragmented ions, as schematically illustrated in FIG. 4A. In addition, a method for operating a device for fragmenting ions by collision, having a step where ions are moved through a device for fragmenting ions by CID 100, and by applying specific voltage potentials to the first and second conductive grids 10, 20 of the CID 100 as exemplarily illustrated in FIG. 4B. Generally, the present application relates to different aspects of ion mobility separation, ion accumulation, ion trapping, and particularly ion fragmentation using the CID technique, for example with the herein described device for fragmenting ions by CID 100.

Generally, ion mobility separation of positively or negatively charged ions in an inert buffer gas can be achieved by applying one or more DC and alternating electric potentials to electrodes on a pair of printed circuit boards (PCB), or other type of substrates or plates having such electrodes, also referred to as structures for lossless ion manipulation (SLIM) device. A SLIM device generally includes a pair of PCBs that are arranged in parallel to each other to form an ion motion channel or area therebetween, one PCB being the mirror image of the other, with a repeating pattern of electrodes to apply DC, radiofrequency (RF), and so-called travelling wave (TW) electrical potentials, these aspects being illustrated in FIGS. 5A to 5D. In one implementation of a SLIM device for performing SLIM, a superposition of DC, radiofrequency RF, and TW electrical potentials is used to confine and guide ions through a buffer gas. The time that ions need to traverse a defined drift path is then dependent on the specific ion mobility.

Such devices utilizing this technique are described in U.S. Pat. Nos. 8,835,839 and 10,317,364, these references herewith incorporated by reference in their entirety. The SLIM ion mobility spectrometry (IMS) technique can be used to create temporally and spatially separated ion packets, which then can be manipulated or detected, as well as to filter ions of a particular mobility in a low-pass, high-pass, or band-pass SLIM arrangement. The mobility filter device produces a continuous flow of mobility-selected ions, which can then be further manipulated or detected. Furthermore, different regions on a SLIM device can be configured for ion transport, ion mobility separation, and ion accumulation/storage, as disclosed in U.S. Pat. Pub. No. 2021/0364467, this reference herewith incorporated by reference in its entirety.

According to at least some aspects of the present invention, the herein proposed device for fragmenting ions by CID 100, SLIM device 200 including a device for fragmenting ions by CID 100, and systems and methods using CID, the SLIM technology described above and are improved upon, as not only the ions can be stored and separated by their respective mobilities, but also can also selectively induce the fragmentation of ions by CID of a particular mobility, to accumulate fragment ions over a defined period of time, and to separate fragment ions by their respective mobilities before they can be transmitted either to a detector, for example to record ion drift times, or to a mass-spectrometer type instrument. The process of fragmentation, accumulation, and mobility separation can be repeated multiple times, for example n-times, to perform IMS type experiments.

One technique that can be used for identification of fragment ions is gas-phase infrared (IR) spectroscopy, which can be performed on ions at room temperature using infrared multiple photon dissociation (IRMPD) or at low temperatures using cryogenic messenger-tagging spectroscopy. These techniques can yield robust and, in the case of cryogenic spectroscopy, highly resolved, structure-specific IR spectra that can be used for compound identification.

FIG. 4A shows a schematic and simplified view of the elements of an ion mobility-mass spectrometry device or system 300 that can provide for IMS$^n$ capabilities. The device or system 300 incudes an ionization source 310, for example but not limited to an electrospray ionization (ESI), proton transfer reaction (PTR) ionization, plasma ionization, matrix-assisted laser desorption/ionization (MALDI), a IMS device 320 having a device for fragmenting ions by CID 100, the IMS device 320 configured for ion transport, storage, mobility separation, an CID fragmentation, and a mass spectrometer (MS) 330 as an exemplary ion detection region or device, that can include further interrogation techniques such as IR spectroscopy. The ionization source 310, IMS device 320, and MS 330 are part of a vacuum system 340, which can include vacuum pumps and buffer gas flow controllers or valves. A computing device 350 and a controller 360 can monitor and control the conditions of the process, for example but not limited to the pressures and gas flows inside the vacuum system 340, and can monitor and define the electric DC, RF, and TW potentials applied to the ion source, the electrodes on the IMS device 320, and the mass spectrometer MS 330. In addition, a power source 370 is provided, for generating the different voltages or electric potentials for the electrodes.

The power source 370 is configured to provide DC electric potentials to the electrodes of the CID 100, for example to contact a and contact b as shown in FIG. 1B, and to the separation region and storage region of the SLIM device 200, and power source 370 is either configured to change the DC electric potential based on a predefined timed sequence between predefined DC levels or is connected to a voltage pulser and timing device, which together can change DC levels within the CID device 100 and the following accumulation region of the SLIM device 200 with a predefined timing scheme for performing fragmentation on selected ions, storage of parent and fragment ions, and re-injection into the separation device.

Figure 4B:
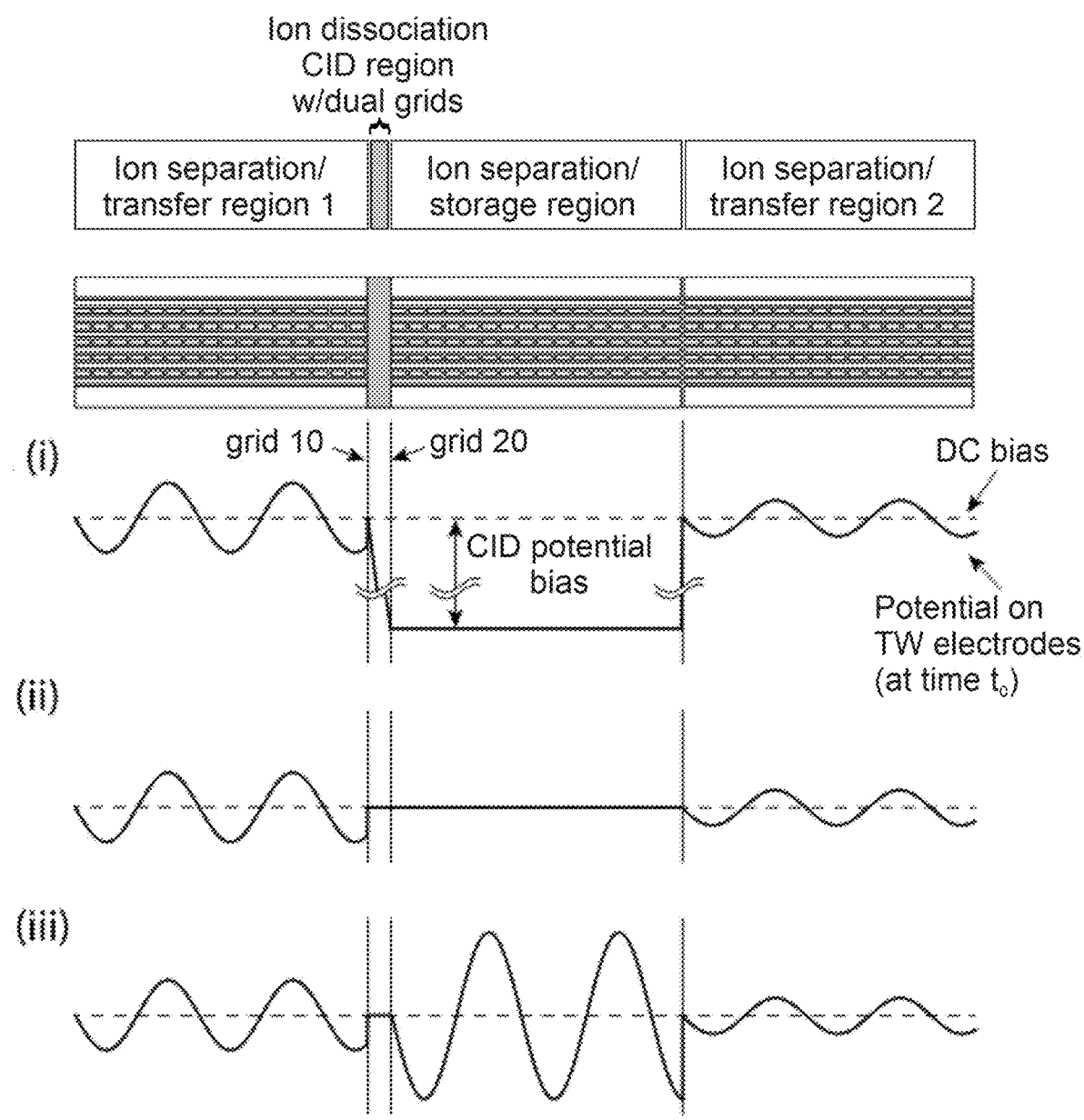

For example, FIG. 4B illustrates the application of the different voltages to the electrodes of the SLIM device 200 having a CID device 100, for example by use of the voltage or power source 370 and controlled by the controller 360. In this respect, FIG. 4B together with the system or device 300 shown in FIG. 4A show aspects of a method for controlling ion motion through a system 300, a SLIM device 200 having a CID device 100, using CID device 100 for ion fragmentation. The two upper sections of FIG. 4B show an exemplary arrangement of separation region 1, and followed by an ion accumulation/storage region. The accumulation region is followed by a second ion separation/transfer region 2, which may be the same as ion separation/transfer region 1 or guide the ions back to the beginning of this separation region to perform cyclic IMS separations. The lower section of FIG. 4B illustrates the TW and DC offset potentials applied to the different regions and the CID device 100 while performing fragmentation and accumulating positively charged ions (i), and reinjection of fragments and parent ions into the second separation region ((ii) and (iii)) for one instant in time. The DC offset potential as indicated in parts (i), (ii), and (iii) is applied to all elements in a given region, for example but not limited to the TW, RF, guard DC, or any electrode used for blocking of ions.

The CID potential bias as indicated in (i) is given by the difference in DC potential between grid 1 and grid 2 of the CID device 100. For continuity of electric DC potentials, the DC bias level of the ion separation/transfer region 1 is held on the same or a substantially similar DC level as that of grid 1, within a few Volts, and the DC bias level of the accumulation/storage region is held on the same or a similar DC level as that of grid 2 while fragmentation and ion accumulation is performed (i). This situation is maintained for as long as incoming ions are to be fragmented. Before fragment and parent ions can be reinjected into a separation or transfer region, the DC bias voltage of the ion accumulation region needs to be brought to the same level as that of the following ion separation/transfer region 2 (*ii*). As a last step, to ensure efficient transmission of ions from the accumulation region into the separation region, a TW potential is superimposed to the electrodes in the accumulation region, which transports the ions toward ion separation/transfer region 2 where a second travelling wave potential drives the ions forward. All electric potentials and the sequence of their application to the electrodes can be defined by a controller 360 connected to a power source 370 that is in operative connection with controller 360 for controlling the voltage applications sequences. For example, a predefined timing scheme can be applied to switch all (TW and DC) voltages between predefined values, or to ramp voltages to these predefined values at the desired times to perform CID on selected ions.

Figure 5A:
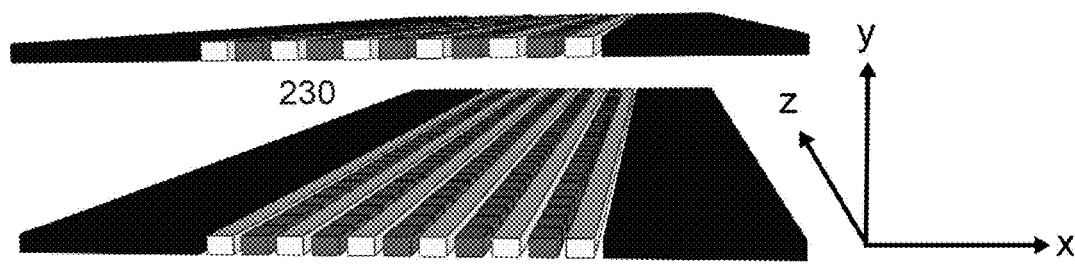
FIGS. 5A to 5D visualize different aspects of the structure for lossless ion manipulation (SLIM) device, with FIG. 5A showing the arrangement of electrodes on the surface of a pair of exemplary printed circuit boards or other types of substrates with conductors providing for the SLIM device.

In a preferred embodiment, the IMS device 320 includes a device using structures for lossless ion manipulation (SLIM), also referred to as the SLIM device 200, as further described below. In system 300, ions generated in the ionization source 310 are transferred into the SLIM device 200, which is discussed in more detail below in relation to FIGS. 5A to 5D, and FIGS. 2A and 2B. A SLIM device 200, for example one with or without the device for fragmenting ions by CID 100, includes electrodes on the surface of a pair of plates, for example PCB A and PCB B, where one PCB represents a mirror image of the other. These PCBs are arranged opposite to each other, with a gap of typically a few millimeters, as shown in FIG. 5A.

Figure 5B:
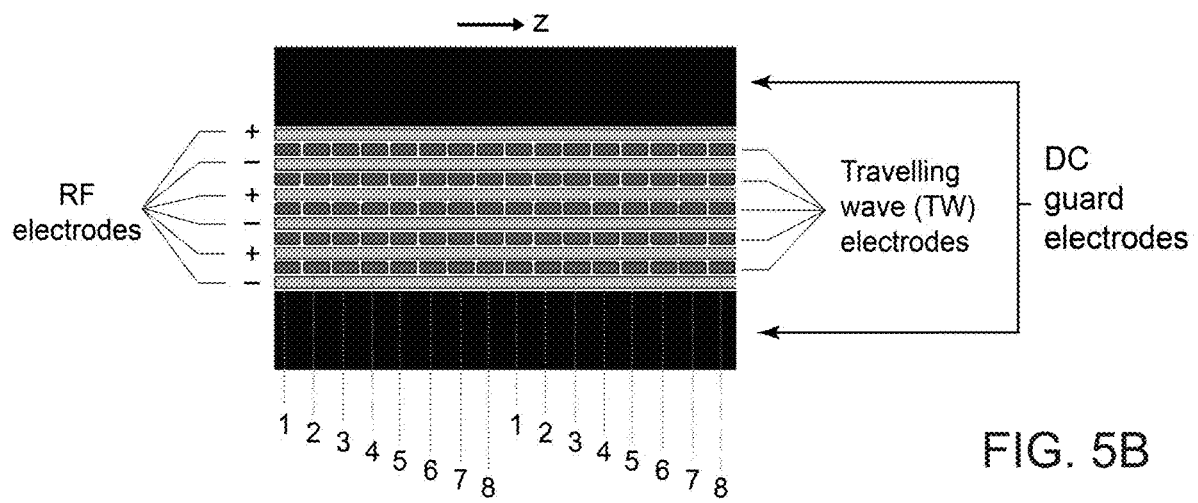
Figure 5C:
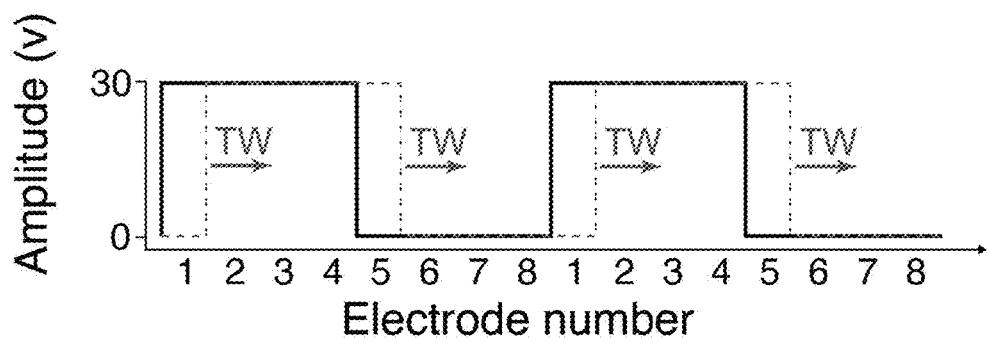
Figure 5D:
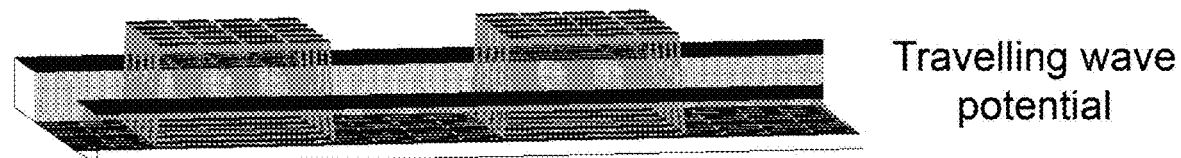

For a SLIM device 200, the plurality of electrodes on the surface of one exemplary SLIM PCB are shown in FIG. 5B. In one implementation of a SLIM device 200, the electric potentials guiding the ions through a channel or path 230 of SLIM device 200 are defined by three types of electrodes: DC guard electrodes, RF electrodes, and TW electrodes. Two RF electrical potentials, shifted in phase by 180°, are applied to the RF electrodes labeled '+' and '−' in FIG. 5B. The resulting electric fields confine ions in y direction, being the normal vector of the PCB surface. A symmetrical DC voltage can be applied to the so-called guard electrodes, which helps to confine ions in x direction, being the direction that is transversal to the ion path. In one implementation, each electrode in a periodic pattern of eight (8) TW electrodes carries a time-dependent waveform electrical potentials, such but not limited to a square wave, a sine wave, or a sawtooth waveform, which is shifted in phase by 45° with respect to the potential applied to the neighboring electrode, as shown in FIG. 5C. This way the electrical potential will travel or move across the PCB surface over time. The sign of the phase shift from one electrode to the next determines the direction of travel. This travelling potential wave, illustrated for one moment in time for the example of a square waveform in FIG. 5C, is used to propel ions through the channel or path 230 of the SLIM device 200.

Using such electrodes arrangements in the SLIM device 200, ions can be transported in a nearly lossless manner even through corners and turns, which allows to manipulate the ion path over the entire surface of a PCB, see for example U.S. Pat. No. 10,522,337. In one possible implementation of the SLIM device 200, the electrode pattern defining the ion path can be separated into different regions where the electric potentials applied to the RF, TW, and DC guard electrodes are defined separately by controller 360. In such a setup, the electric potentials in the different regions can be used for ion accumulation, transport, separation, intermediate storage, and to induce collision induced dissociation (CID) as further described below. An example for an electrode pattern featuring different regions is shown in FIG. 3, where a region is arranged having the device for fragmenting ions by CID 100 arranged between the ion separation/transfer region and the ion accumulation/storage region. Here the electrodes for RF, TW, and DC guard electric potentials are controlled completely separately by controller 360. In such an electrode arrangement, the ion separation/transfer region 1 can be configured to separate ions by their ion mobility, a subset of the separated ions can then be loaded into the ion accumulation/storage region where they can be held for a defined amount of time before the content of the storage region can be emptied into the ion separation/transfer region 2 where either further mobility separation can occur or where ions are simply transferred towards the MS/detection region, for example at mass spectrometer MS 330.

Figure 2A:
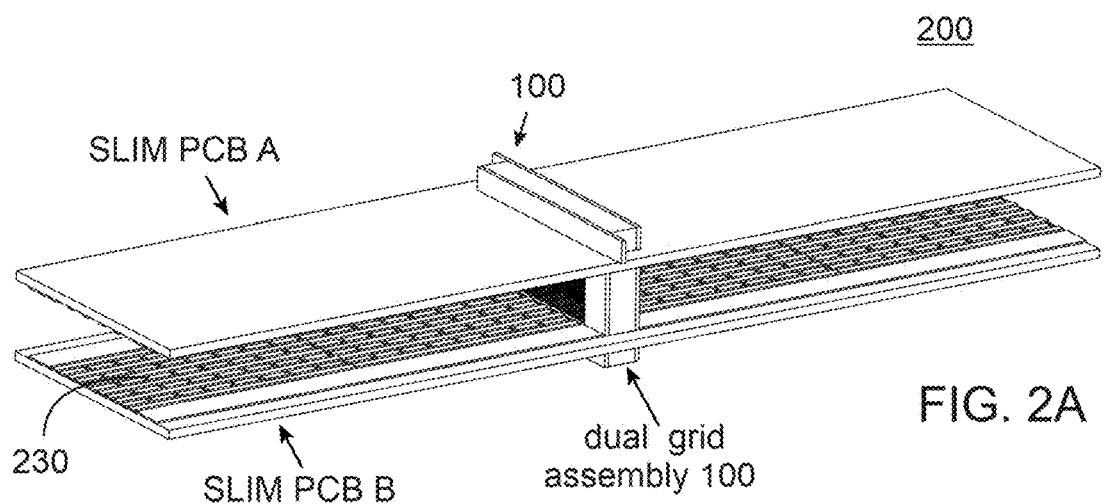
FIGS. 2A and 2B showing a perspective visualization of a SLIM device 200 with the device for fragmenting ions by CID 100 integrated therein, with FIG. 2A showing an upper electrode plate and a lower electrode plate, exemplarily implemented as PCB A and PCB B, for generating the travelling waveform (TW) and for passing the ions through the device for fragmenting ions by CID 100, and FIG. 2B showing another perspective view of the SLIM device 200 with the upper electrode plate or PCB A removed for illustration purposes, showing the placement of the device for fragmenting ions by CID 100 placed between a ion separation/transfer region of SLIM device 200 and an ion accumulation/storage region of the SLIM device 200.
Figure 2B:
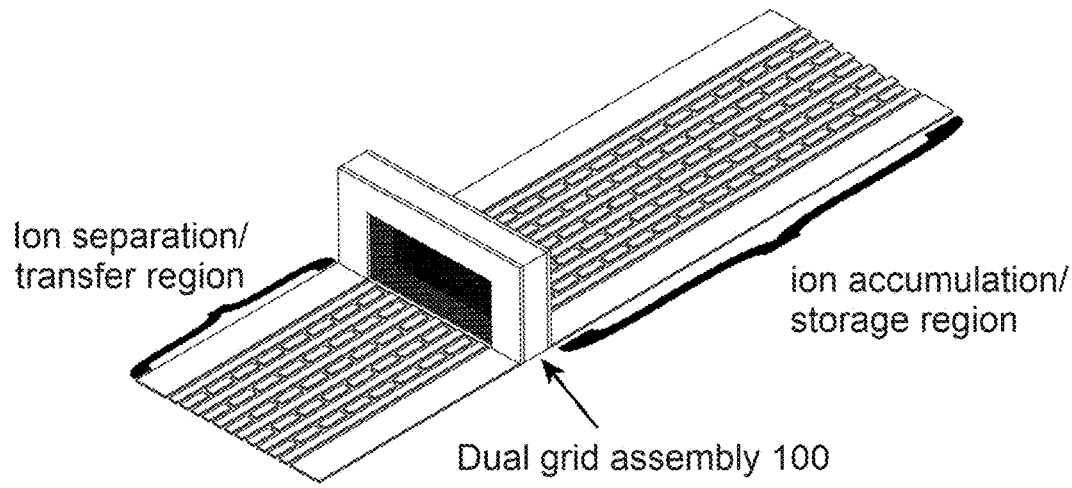

According to an aspect of the present invention, a device for fragmenting ions by CID 100 is provided, as illustrated in FIGS. 1A and 1B, and in an exemplary embodiment, it is possible to fragment ions while they pass from the 'ion separation/transfer region 1' to the 'ion accumulation/storage region' of the SLIM device 200, as illustrated in FIGS. 2A and 2B. For example, as described above, a dual wire-grid assembly with two wire-grid elements can be provided as a first and second conductive grid 10, 20, shown in FIG. 1A arranged next to each other for illustration purposes, with the second conductive grid 20 configured to be arranged downstream relative to the first conductive grid 20, a first and second conductive frames 15, 25 holding the first and second conductive grids 10, 20, respectively, to form the device for fragmenting ions by CID 100 with a dual wire-grid assembly, with an insulating, distance-defining spacer 30 having an open window in-between the first and second conductive grids, as shown in FIG. 1B.

These high-transmission wire-grids 10, 20 can be used to define the electric potential on a plane perpendicular to the motion of ions inside the channel or path 230 of the SLIM device 200. In the context of this description, a plurality of wires is considered a grid when more than one wire is used to define the electrical potentials on the plane that is perpendicular to the ion direction of motion. Two wires, positioned in parallel or not, will define the plane on which the electrical potential is to be defined. Any additional wire ought to be positioned on the same plane as the one defined by the first two wires. In a preferred embodiment, a grid 10, 20 is defined by a plurality of electrically conducting wires where individual wires in a first set of wires 12 are positioned in parallel to each other and a similar second set of parallel wires 22 is positioned on the same plane as the first set of wires but in a position where the wires inside the first set are not parallel to the wires in the second set.

In a preferred embodiment, the distance between individual wires within one set of wires should be less than the distance between the two PCBs defining the ion path or channel 230. Even more preferably, the grid should be constructed from electrically conducting wires positioned at a wire density of more than 10 wires per inch (WPI). The thickness of an individual wire needs to be less than the distance to the next wire. The data of the results presented below with respect to FIGS. 6B, 7A, and 7B was acquired using grids constructed from wires at a density of seventy (70) WPI with a wire thickness in a range between 5 and 300 micrometers, in the exemplary embodiment about 19 micrometers.

When two such conductive grids 10, 20 are placed close to each other, for example in the millimeter and sub-millimeter range, high and homogeneous electric fields of several thousands V/cm can be produced inside an ion mobility spectrometer without voltage breakdown or electrical discharge. The width of each individual window of the first and second wire grids 10, 20 should at least correspond to the width of the ion path or channel defined by the electrodes on the PCBs of the SLIM device 200 and the height of the window should at least correspond to the separation gap forming the path or channel 230 between the two PCBs of the SLIM device 200. In a preferred embodiment, the gap between the two parallelly-arranged first and second wire grids 10, 20 should not be wider than the separation gap between the two PCBs to yield the desired results. Expressed in a ratio, the grid-separation gap to PCB-separation gap should be in a ratio of less than 1/1.

One possible implementation of a device for fragmenting ions by CID 100 is shown in FIGS. 1A and 1B, two conductive frames 15, 25 are shown, for example metallic frames with a high conductivity, where a wire-grid is applied to the inside a first and second window 17, 27 forming a rectangular opening of each of the frames 15, 25. These wire-grid frames 15, 25 can be assembled in a fixed distance by placing an insulating material between them, for example a spacer 30 itself having a window 37 for passing the ions. The size of the windows 17, 27 in each frame 15, 25 should correspond to the cross-sectional area of a SLIM ion transport channel or path 230, in other words, the height of windows 17, 27 corresponds to the dimension of the separation gap of the two PCBs A and B of the SLIM device 200 and the width of the windows 17, 27 corresponds the width of the SLIM ion path or channel 230, for defined by a width of a surface area of the electrodes measured in a direction that is perpendicular to the motion direction of the ions. With a non-limiting example and embodiment that was used for experimental tests, the separation of the two wire-grid frames 15, 25 was 0.8 mm, while the height was 2.75 mm and the width was 6 mm. The extensions on the frames 15, 25, labelled "contact a" and "contact b" in FIG. 1B were used to provide for a voltage for defining the electric DC potentials of each of the two frames separately, for example by the use of a controller 360 and power source 370.

In a non-limiting exemplary embodiment, a pair of Nickel (Ni) meshes or lattices were used with 70 lines-per-inch (LPI) each in both the x and the y direction for the parallelly-arranged wires 12, 22 of both the first and second conductive wire grids 10, 20. The wire line width for the mesh material was exemplarily 19 µm, and the resulting transmission of each of the meshes is 90%. These Ni meshes are applied to their support frame 15, 25 by spot-welding or using conductive glue or paint. The insulation material between the two grids was PEEK, for example to form a spacer 30 with a traversing opening or window 37, but other vacuum compatible, insulating materials may be used as well. The thickness of the insulating material separating the two grids in our implementation is 0.8 mm. The separation between the two grids should not be larger than the separation between the upper and lower electrode plates of the SLIM device 200, for example the PCBs. As a non-limiting example, the separation between SLIM PCBs can be in the order of 3 mm. Instead of using wires, it is also possible to use conductive bars, columns, or other linearly-extending conductive elements. It is also possible that the first and second conductive wire grids 10, 20 are made of a matrix, lattice, network, or grid where holes, for example circular or rectangularly-shaped holes have been etched or otherwise provided into a sheet of conductive material, for example a sheet of Nickel. Such grids 10, 20 would allow the integration of the frames 15, 25 with the grids 10, 20.

As illustrated in FIGS. 2A, 2B, and 3, the device for fragmenting ions by CID 100, for example the dual wire-grid assembly, can be placed in-between two plates or PCBs A and B, where an insertion gap 50 has been provided to accommodate the parallelly-arranged frames 15, 25, to provide for a space for the insertion between the ion separation/transfer region 1 and the ion accumulation/storage region. For example, this can be embodied by providing a slot or rectangular opening into the PCBs A and B, for example by milling or drilling out a slot or rectangular opening from both PCBs A and B, to allow the placement of the device for fragmenting ions by CID 100 to be placed in-between two separate SLIM regions as defined in FIG. 3. FIG. 2B shows an example of such a placement where device 100 is located between an "ion separation/transfer region" and an "ion accumulation/storage region."

Next, exemplary data is provided to illustrate the function of the device for fragmenting ions by CID 100 that was installed in a SLIM device 200 in an arrangement as shown in FIGS. 2A, 2B and 3. To induce CID on positively charged ions, the DC bias voltage of the first conductive grid 10 was fixed to the DC bias voltage of the "ion separation/transfer region 1" and the DC bias voltage of the second conductive grid 20 was fixed relative to the DC bias voltage of the "ion accumulation/storage region". CID conditions were achieved, depending on the identity of the molecular ions, when the voltage difference between the first and the second grid 10, 20 exceeded approximately 50 V, and improved as the voltage difference increased. Before ions are sent towards the "ion separation/transfer region 2", the DC potential bias of the second conductive grid 20 and the "ion accumulation/storage region" was brought back to the same DC level as the "ion separation/transfer region 2", for example by the controller 360 that can be configured to control the application of the different DC bias voltages to the device 100 with a power source 370. An electric interconnection between the first and second electrically conductive grids 10, 20 can be done by a wire bonding between contacts a and b to interconnection elements of power source 370, or also by electrical interconnection with the different regions of the SLIM device as explained above, for example by wire bonding, direct soldering or bonding between dedicated contacts. Once unloaded into this region, ions can undergo further mobility separation cycles, or further fragmentation using the same CID device, followed by additional separation cycles of newly generated fragments of fragments, in an IMS fashion, or can be sent towards the detection region of the system 300.

Figure 6A:
FIGS. 6A and 6B show information to highlight the impact of the device for fragmenting ions by CID 100, with FIG. 6A showing the structure of a Lacto-N-tetraose (LNT) molecule that was used to test the CID performance of device for fragmenting ions by CID 100, and FIG. 6B showing two graphs that show the time-of-flight mass spectra of the undissociated, singly sodiated precursor ions at the bottom where no device for fragmenting ions by CID 100 was present in the SLIM device 200, and of their fragments at the top when the device for fragmenting ions by CID 100 was present in the SLIM device 200.
Figure 6B:
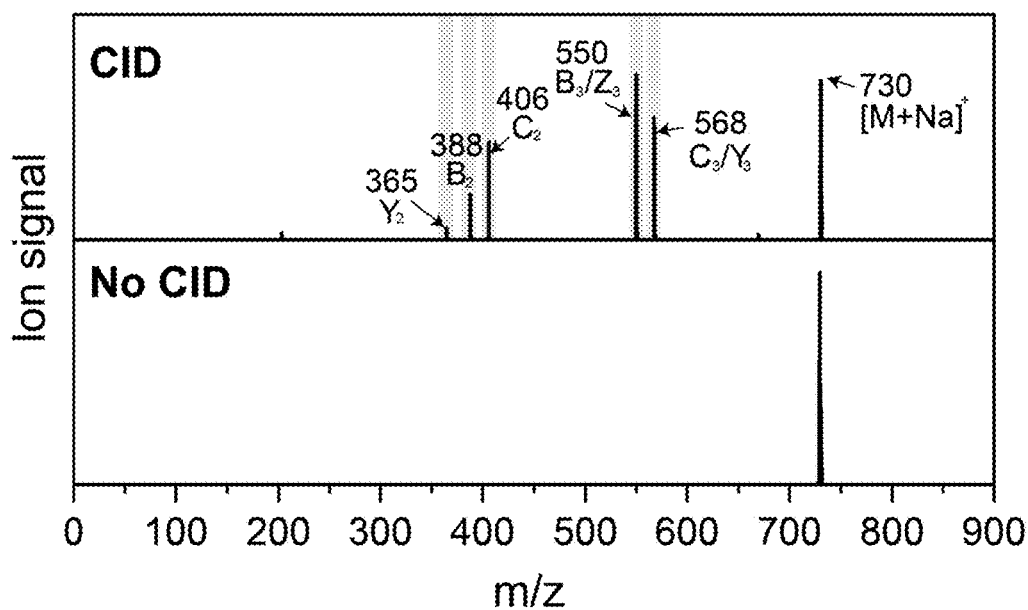

The graphs shown in FIG. 6B show different fragment ions and remaining precursor ions that were sent directly toward detection, for example by MS 330 with an exemplary system 300. The system 300 includes a nano-electrospray ionization source 310, a SLIM device 200 with separate regions for ion accumulation, transport/transfer, CID by the use of device 100, intermediate storage, and ion separation with a single-pass path length of around ten (10) meters, and a time-of-flight (TOF) mass analyzer MS 330.

As an example, the human-milk oligosaccharide lacto-N-tetraose (LNT) as shown structurally in FIG. 6A, was used to test the CID performance of the device for fragmenting ions by CID 100 in collaboration with the SLIM device 200. Singly and doubly sodiated species were produced in the nano-electrospray ion source, ion-mobility separated from other ions in a SLIM region equivalent to the 'ion separation/transfer region 1' described above and loaded into an 'ion accumulation/storage region' after passing the dual wire-grid assembly. FIG. 6B shows time-of-flight mass spectra of singly sodiated ions after re-injection into the 'ion separation/transfer region 2' and mass analysis in the TOF analyzer as an exemplary MS 330 without applying conditions under which CID fragments are observed, see the bottom graph, and under CID conditions, see the top graph. Typical CID fragments are observed for these singly charged ions. The m/z values are annotated and fragments are labelled according to standard oligosaccharide/glycan nomenclature. A fragmentation yield Y can be determined from the intensities of the signals corresponding to the individual fragments $I_f$ and the intensity of the signal corresponding to the precursor ion $I_p$ by using the following Equation (2):

$$Y = \frac{\sum_f I_f}{\sum_f I_f + I_p} \quad \text{Equation (2)}$$

where $\sum_f I_f$ represents the sum of intensities over all observed fragments. Using this definition for Y, a yield of 1.0 corresponds to a dissociation of all precursor ions and detection of all fragment ions.

Figure 7A:
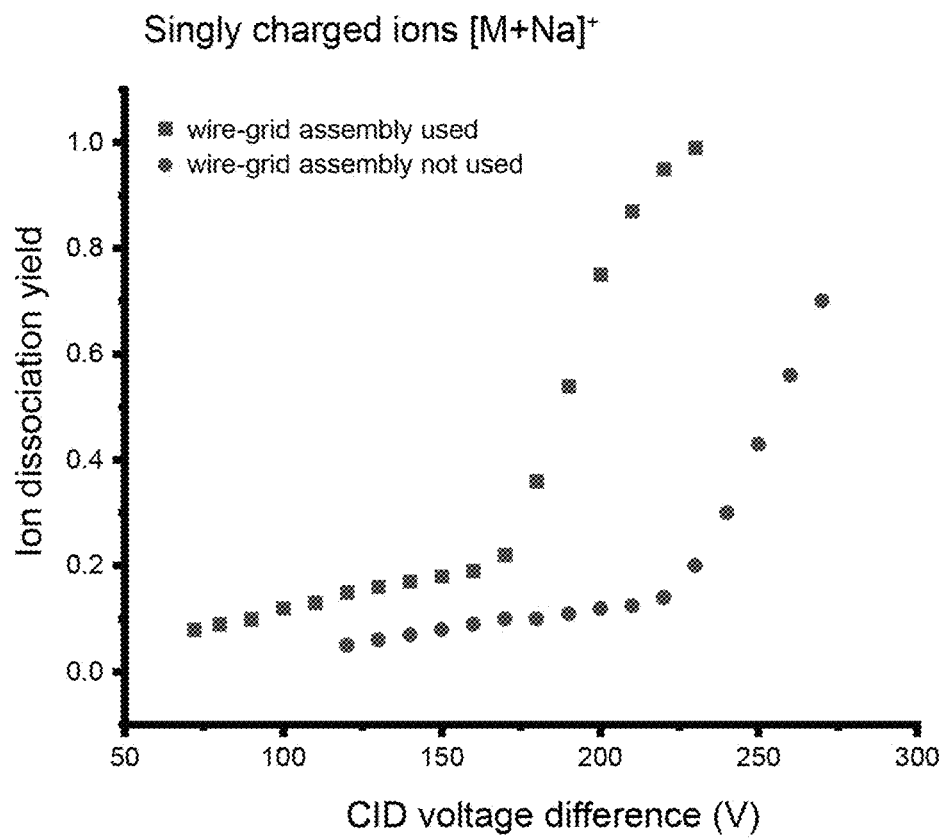
FIGS. 7A and 7B show graphs that depict fragmentation yield as a function of CID voltage difference applied between the first and second conductive grids 10, 20, with FIG. 7A showing a singly sodiated ion, and FIG. B showing a doubly sodiated ion.
Figure 7B:
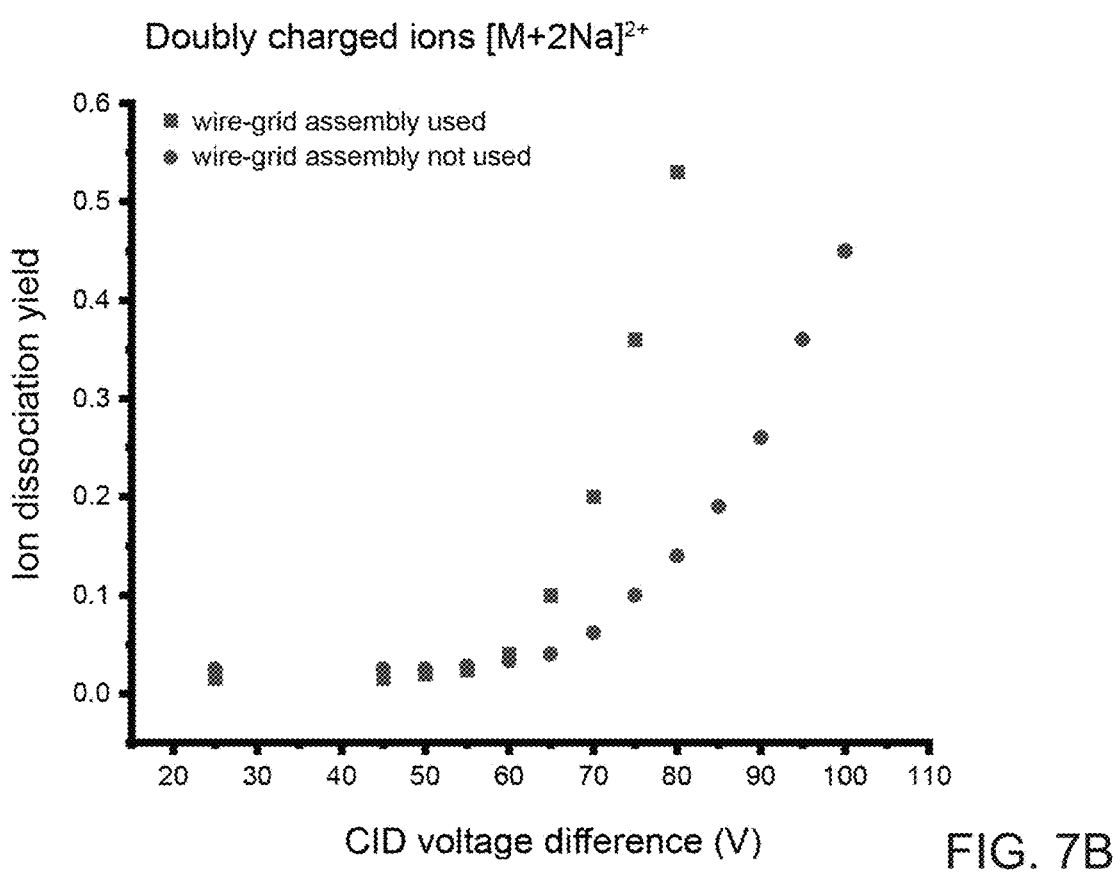
Figure 8:
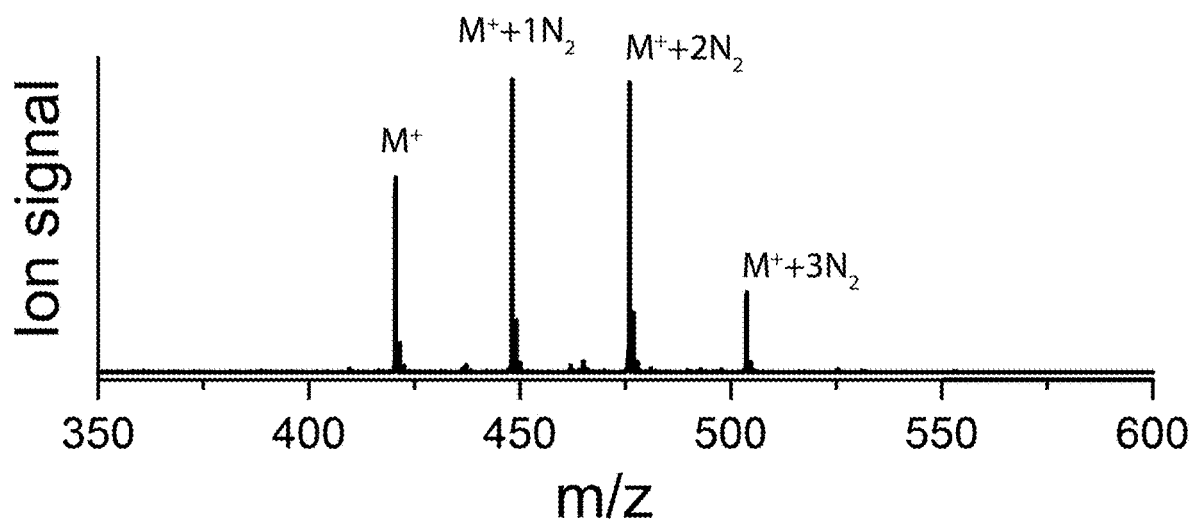
FIG. 8 shows a graph representing a Time-of-flight mass spectrum of singly charged disaccharide molecular ions after complexation with $N_2$ messenger tags inside of a cryogenic ion trap, where W indicates the bare, untagged ion.
Figure 9A:
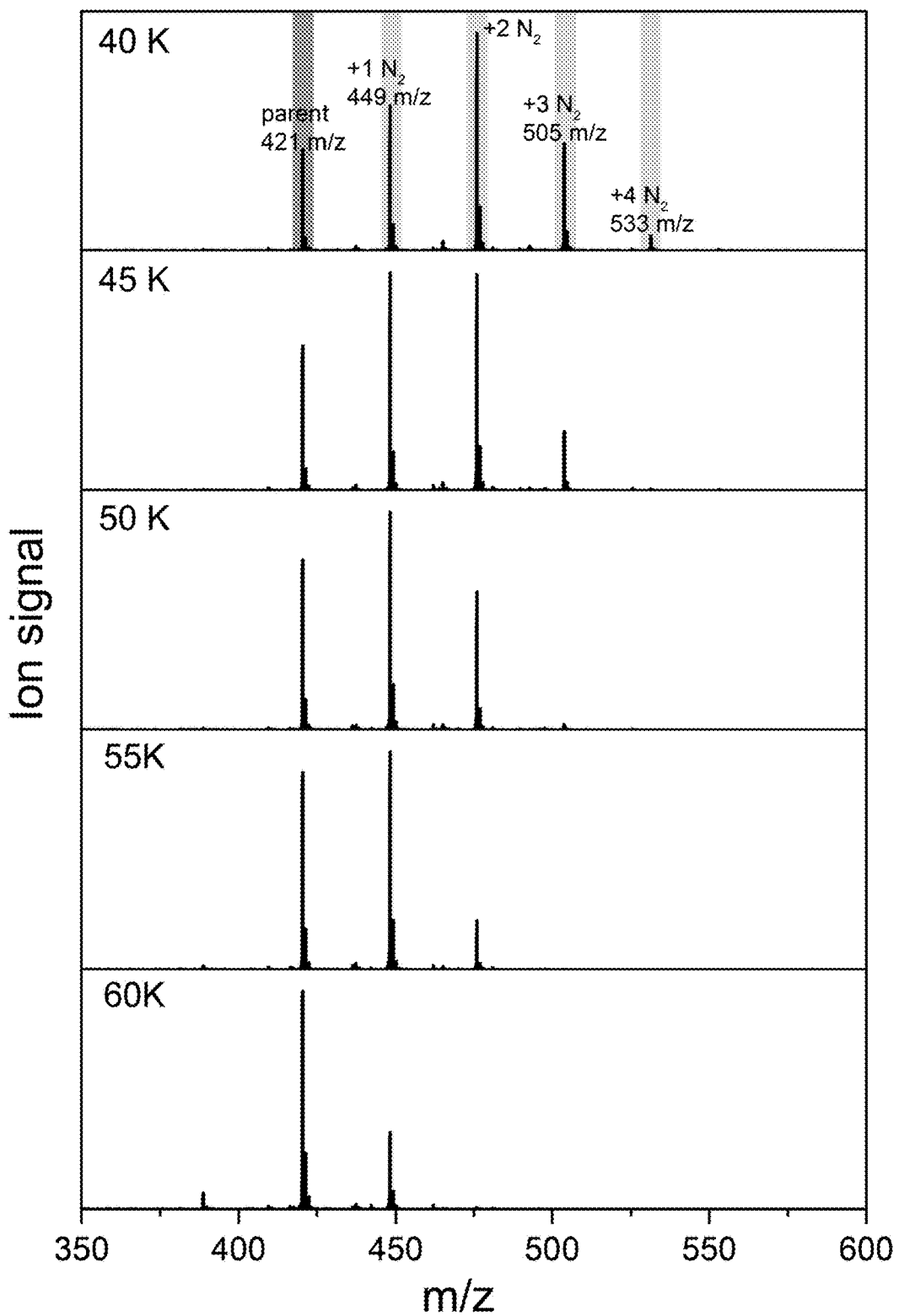
FIGS. 9A and 9B show different graphs showing mass spectra and a tagging yield to show the influence of the temperature of the cryogenic ion trap, with FIG. 9A showing time-of-flight mass spectra of singly sodiated disaccharide molecular ions, complexed with different amount of $N_2$ messenger molecules inside a cryogenic ion trap held at different temperatures from 40 K to 60 K, seen in the graphs from top to bottom, and FIG. 9B showing tagging propensity expressed as the tagging yield as defined in Equation (1) as a function of temperature of the cryogenic ion trap as observed for the singly sodiated disaccharide molecular ions.
Figure 9B:
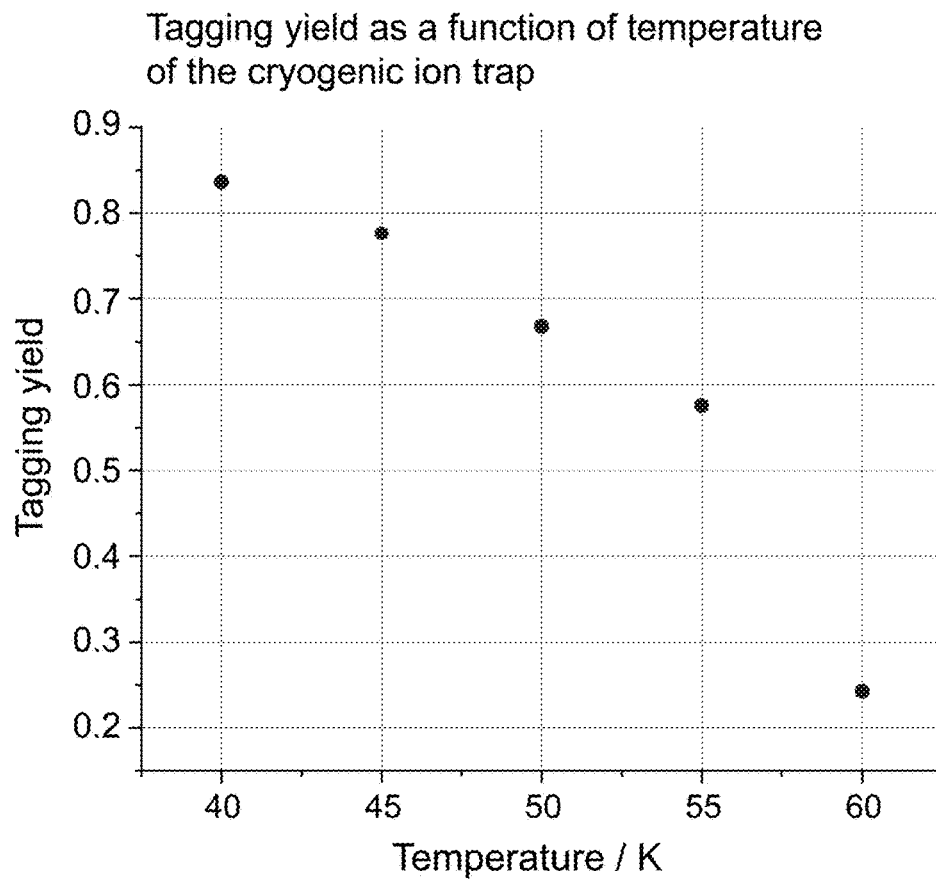

The DC bias voltage $DC_2$ of the second conductive grid 20 and of the storage region was varied with respect to the potential bias $DC_1$ of the 'ion separation/transfer region 1' and the first conductive grid 10, and the fragmentation yield was determined as a function of the resulting 'CID voltage difference' $DC_1 - DC_2$ for the singly sodiated, see FIG. 7A with the squares, as well as the doubly sodiated ions, see FIG. 7B, with the squares. While for singly charged ions, the fragmentation yield approaches a value of 1.0 at a voltage difference of approximately 225 V, a yield of approximately 0.5 can be achieved for doubly charged ions at a CID voltage difference of 80 V. It is interesting to note that the homogeneous electric field inside the dual wire-grid assembly of the CID device 100 reaches a value of approximately 3'000 V/cm at a 225 V voltage difference used to dissociate the singly charged ions.

For comparative purposes, the performance by the CID device 100 can be compared to that of a setup that does not use a dual wire-grid assembly but where the 'ion separation/transfer region 1' is directly followed by the 'ion accumulation/storage region'. In this setup, these two regions are separated by a small gap of 0.2 mm and a DC bias difference is applied between these regions to perform CID. The resulting fragmentation yield as a function of CID voltage difference is plotted as circles in FIGS. 7A and 7B. To achieve a fragmentation yield of 0.5 for singly charged ions a CID voltage difference of approximately 250 V needs to be applied, which is 80 V higher than that necessary to yield the same fragmentation when CID device 100 with the wire grids are used. For doubly sodiated ions, a voltage difference of approximately 25 V higher than that applied to the wire-grids of the CID device 100 is required for a fragmentation yield of 0.5 for the molecules investigated here. The dual wire-grid assembly of the CID device 100 clearly improves the fragmentation yield for ions of different charge states over that observed for a setup where no such grids are used. Depending on the nature of molecules investigated, this improvement in fragmentation yield can make the difference between being able to observe fragments or not because the maximum possible voltage difference that can be applied to the different regions will always be limited by electrical discharges and voltage breakdown. The ability to achieve highest fragmentation yield with lowest DC voltage difference is therefore desirable. It can be concluded that ions can be effectively dissociated and fragment ions can be maintained when using a wire-grid assembly of the CID device 100 on the interface between two regions on a planar PCB-based IMS device, for example a SLIM device 200. A high dissociation yield is generally desirable, and it depends largely on the maximum voltage difference that can be applied between the conductive wire grids 10, 20.

To briefly recapitulate, with the herein presented device for fragmenting ions by CID 100, SLIM device 200 using the device 100, and system 300 and a method of operating the same, it is possible to facilitate and substantially improve the performance of collision induced dissociation (CID) inside of a planar ion mobility spectrometer that uses structures for lossless ion manipulation (SLIM) technology. Without the aspects of the invention described herein, the dissociation yield that can be achieved on ions on a SLIM device 200 is poor. The ability to dissociate ions on a SLIM device 200 is desirable as it facilitates in-depth structural analysis of molecular ions. Specifically, the fragmentation yield observed using the device for fragmenting ions by CID 100 is substantially higher than that observed without one. A homogeneous electric field of around 3'000 V/cm or higher can readily be applied for efficient CID. The limit in electric field is given by Paschen's law. Wire grids that are used for CID and SLIM technology have never been combined, and their combination is not straightforward. A special SLIM device 100 having plates or printed circuit board geometry needs to be designed and manufactured to accommodate the CID device 100. The methods applied for CID the aspect of the invention with SLIM technology are not standard in SLIM devices 200. They require careful timing and switching of voltages, as discussed above and shown in FIG. 4B.

As discussed above, a device for fragmenting ions by CID 100 can be located between two regions on a SLIM device 200. The DC potential bias of every electrode type, for example but not limited to TW, RF, DC guard, can be controlled separately by a controller 360 and generated by a power source 370 to allow application of the CID and intermediate fragment ion storage method described above with respect to FIG. 4B. Preferentially, a third SLIM separation/transport region follows the storage region to allow further IMS separation or ion transport. This third region may guide ions back to the beginning of separation/transport region 1 to allow cyclic IMS measurements.

In the exemplary SLIM device 200 and system 300, the CID device 100 with the wire-grid assembly can be installed at the interface between a separation region and a dedicated trapping region. From there ions can be re-injected onto the separation region. The layout of the SLIM device 200 allows to perform cyclic IMS, i.e., ions can be routed back to the beginning of the separation region after one separation cycle is completed. The addition of CID capability allows to perform IMS methods where fragment ions can be separated by mobility and subjected to CID using the same wire-grid and trapping region. This process can be repeated n times leading to n generations of fragment ions.

The herein described device for fragmenting ions by CID 100, SLIM device 200, system 300, and methods of operating the same can have many different applications, for example but not limited to glycomics such as biomarker research, characterization and process control of biotherapeutics, characterization of milk and other food oligosaccharides, Metabolomics such as identification of isomeric metabolites, and environmental monitoring and research. Potential uses can be found for pharmaceutical companies, analytical service companies, biomedical research laboratories, university and government research laboratories.

Figure 10:
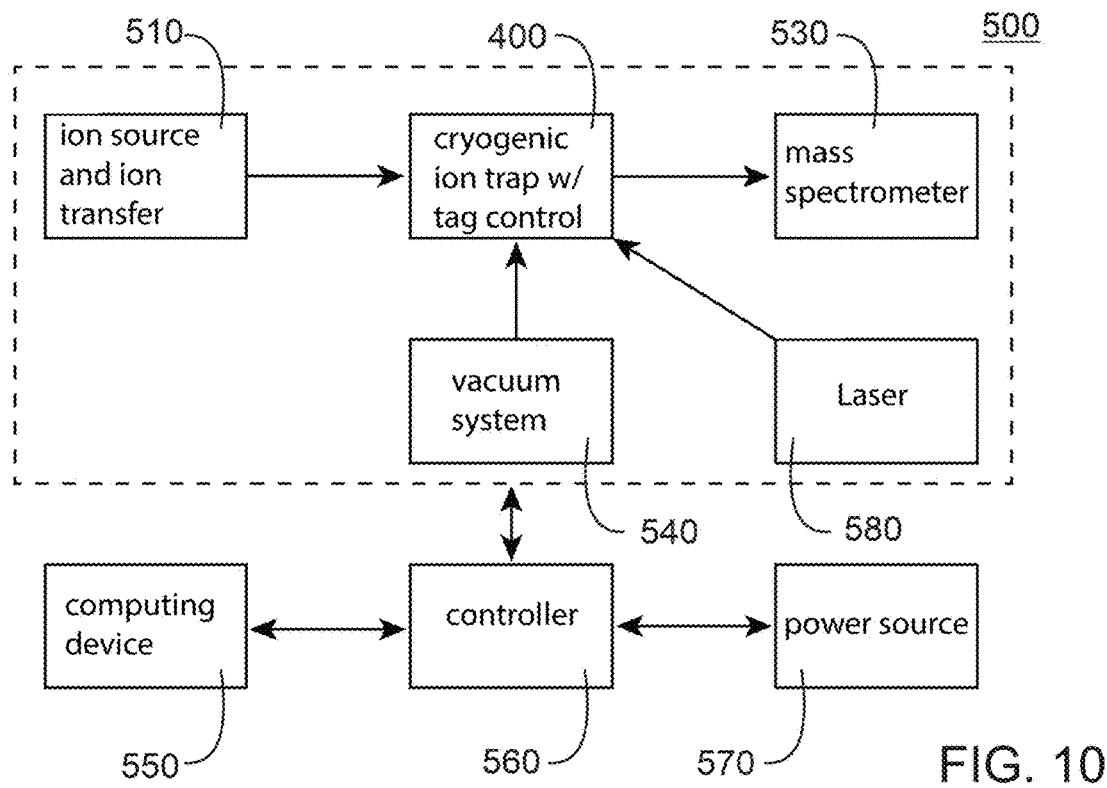
FIG. 10 shows a schematic and exemplary representation of a device or system 500 for messenger-tagging ion spectroscopy with cryogenic ion trap 400 that is configured to dynamically control the amount of tagging by the use of a DC electrode assembly 410, also including a ion source 510, mass spectrometer MS 530, vacuum system 540, computing device 550, controller 560, power source 570, and laser light source 380.
Figure 11:
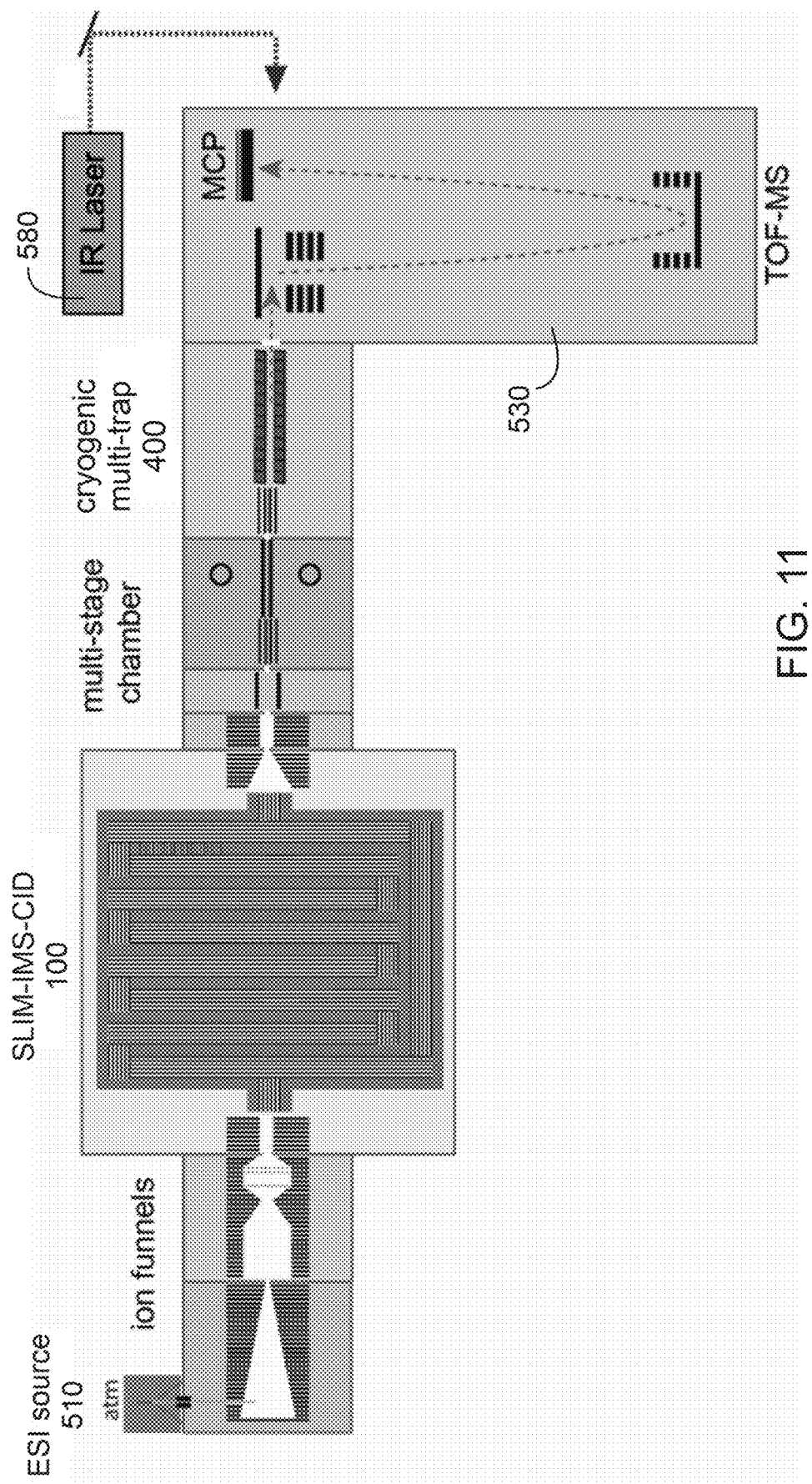
FIG. 11 shows a schematic representation of a device or system 500 for messenger-tagging ion spectroscopy including an ion source and ion transfer device 510, ion mobility device, a cryogenic ion trap 400 having a DC electrode assembly 410 allowing tagging control, an exemplary TOF mass analyzer MS 530, and an IR laser light source 380.

According to another aspect of the present invention, as exemplary shown in FIGS. 12A, 12B, 12C, and 13B, with non-limiting embodiments, a cryogenic ion trap 400 is provided, configured for receiving ions from an ion generation and transfer device 510, for example the one shown in FIGS. 10, 11, the cryogenic ion trap 400 configured to messenger-tag the generated ions, the cryogenic ion trap include an RF electrode assembly 420 and DC electrode assembly 410. Moreover, the cryogenic ion trap 400 further includes an ion channel or path 430 defining an axis of longitudinal extension in which an ion cloud can be formed, the RF electrode assembly 420 including at least a first and second RF electrode 422, 424, the first and second RF electrodes 422, 424 opposing each other with the ion channel 430 arranged in-between, and the DC electrode assembly 410 including first and second DC electrodes 412, 414, the first and second DC electrodes 412, 414 opposing each other with the channel 430 arranged in-between, and arranged transversal to the first and second RF electrodes 422, 424. In this configuration, a DC voltage that can be varied in amplitude and applied across the DC electrodes 412, 414 can move an effective low-filed region away and towards an electrode of the RF electrode assembly 420, as further explained below, permitting control over the relative position of an ion cloud formed inside the ion channel 430, resulting in effective control over the RF-induced ion heating imposed on the trapped ions. The herein presented cryogenic ion trap 400, a system or device 500 including such cryogenic ion trap 400, and methods of operating the same, permit the messenger-tagging of ions with effective and fast control over the degree of tagging observed without necessarily having to change the trap temperature, gas flow, or gas composition.

As described above, a first method with respect to messenger-tagging spectroscopy was first published in 1985 and has since been refined and applied to various classes of molecules or clusters of atoms and molecules. Cryogenic Paul traps, ring-electrode traps, or other multipole trap geometries can be used to store ions and to cool them to the temperatures of their surrounding buffer gas, in preparation for a messenger-tagging spectroscopic scheme. On the other hand, the radiofrequency alternating voltage applied to the trap electrodes can lead to so-called "radiofrequency (RF) heating," a typically undesirable effect in the context of messenger tagging. It is caused by collisions of trapped ions with residual gas molecules in the vicinity of the radiofrequency electrodes, where the amplitude of the ions' oscillatory micromotion—and therefore its kinetic energy—is at its maximum. Such a collision event leads to an increase in the ion internal temperature and can cause a messenger-tagged ion to lose one or more of its tags.

With the herein described cryogenic ion trap 400, cryogenic ion trap assembly 450, system or device 500, and methods of using or operating the same, it is possible to make use of this radiofrequency heating effect in a controlled manner, which allows to dynamically adapt the degree of tagging observed within a tagging-spectroscopy workflow. To achieve this, a DC electrode assembly 410 is provided with additional DC electrodes 412, 414 into the design of a multipole trap as disclosed below. The electric fields generated by these DC electrodes 412, 424 allow to purposefully induce radiofrequency heating and effectively allow control over the degree of tagging observed.

FIG. 10 shows an exemplary device or system 500 for using a cryogenic ion trap 400, including a mass spectrometer MS 530 combined with a cryogenic ion trap 400 and a laser system 380, which allows for tagging control. System 500 includes an ion source and ion transfer system 510, a cryogenic ion trap 400 with means for tagging control by the DC electrode assembly 410, a laser system 380 to provide photons with defined wavelength to irradiate the messenger-tagged ions, and a mass-selective detection region, such as a quadrupole mass spectrometer or a time-of-flight mass spectrometer 530. The ion path must be enclosed in a vacuum system 540 to form device or system 500, whose individual components are monitored and regulated by a controller 560, which can dynamically adapt parameters such as voltages, pressures, gas flow, or temperatures as necessary for system operation, based on commands from a computing device 550, which in turn can operate with a feedback loop with the controller 560 and the other components of the device or system 500. A power source 570 supplies power for the individual components to function. The ions can be generated from electrospray ionization (ESI), proton transfer reaction (PTR), plasma ionization, matrix-assisted laser desorption/ionization (MALDI), atmospheric pressure chemical ionization (APCI), atmospheric pressure photoionization (APPI), electron ionization (EI), chemical ionization (CI), or others. The ion transfer brings ions into the high vacuum region of the instrument and can include additional steps for ion selection, separation, or suppression, such as a quadrupole mass filter, or an ion mobility spectrometry (IMS) device.

FIG. 11 shows an exemplary schematic of an instrument that includes some of the elements described in the system or device 500 of FIG. 10. An implementation of this exemplary instrument has been used to acquire all the experimental data presented herein. It includes an electrospray ion source as ionization source 530, a dual ion funnel transfer system, a SLIM-based planar IMS device 400 with dual-grid assembly for IMS experiments (ion separation and fragment separation), followed by multipole ion transfer devices to bring ions into high vacuum, a cryogenic ion trap allowing controlled tagging of ions, a TOF mass analyzer as MS 530, and a tunable IR laser source 580. A computing device 550 and a controller 560, connected to a power source 570, define all electrical voltages applied to the electrodes on the instrument, some of them in a timed sequence. When tagging spectroscopy is performed, the computing device 510 is configured control system 500 to perform a method to evaluate the TOF mass spectra of the MS 530 for the degree of tagging of selected types of ions and, when the degree of tagging needs to be changed, sends commands to dynamically adapt DC voltages inside of the cryogenic ion trap, by use of controller 560 and power source 570, which in turn influences the tagging. This feedback loop provided by the method allows to maintain constant tagging when ions with different tagging propensities are investigated within a short time.

Figure 12A:
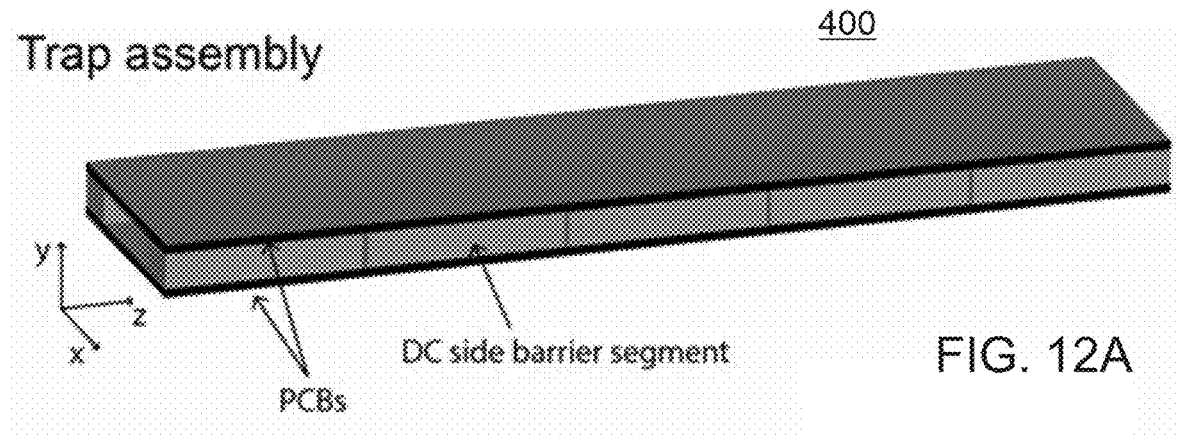
FIG. 12A to 12D show different illustrations with respect to the cryogenic ion trap 400 that is configured to dynamically control the amount of tagging by the use of a DC electrode assembly 410, with FIG. 12A showing a top perspective view of the cryogenic ion trap 400 based on electrodes for the RF electrode assembly 420 on the surface of printed circuit boards (PCBs) and DC side-barrier segments for the DC electrode assembly, FIG. 12B showing a frontal view of the cryogenic ion trap 400 viewed in a direction of extension of the channel or path 430, FIG. 12C showing a schematic view of the electrode layout on one of the trap PCBs, and FIG. 12D showing a schematic representation of the DC potential gradient applied to the DC pad array 460 over the length of the ion trap in a direction of extension of the channel or path of the cryogenic ion trap 400.
Figure 12B:
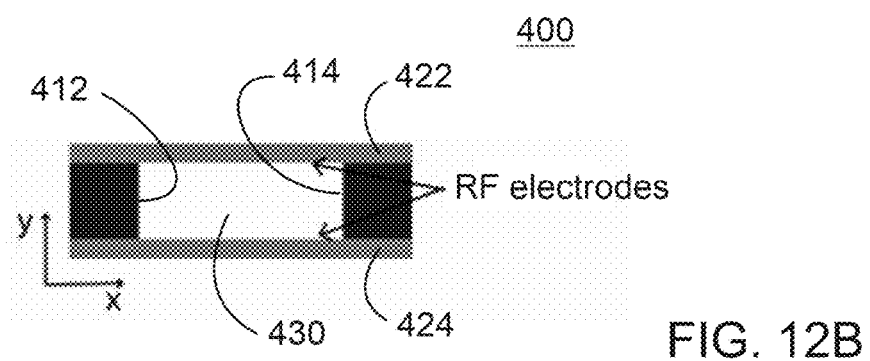
Figure 12C:
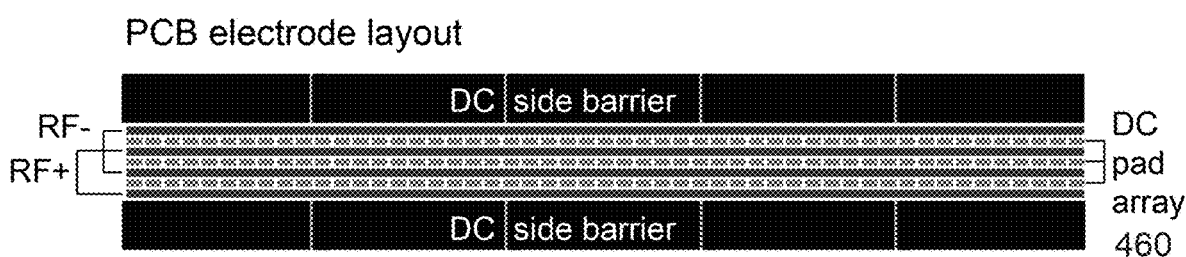

An exemplary implementation of cryogenic ion trap 400 is shown in FIGS. 12A to 12D, configured to control the degree of tagging by the use of a DC electrode assembly 410. Ion trap 400 can include a plurality of electrodes as the RF electrode assembly 420 and the DC pad array 460 on the surface of a pair of printed circuit boards (PCBs) or other types of plates or substrates with electric conductors, and a DC electrode assembly 410 that can be embodied as a plurality of side barrier segments, as DC electrodes 412, 414. The PCBs are arranged opposite each other with the DC side barriers 412, 414 formed with the ion path or channel 430 in-between the two PCBs, as can be seen in the frontal view of FIG. 12B. The electrode pattern on the two PCBs are mirror images of each other, and the exemplary RF electrode assembly 420 and DC pad array 460 are shown in FIG. 12C. The layout represents a flattened multipole RF electrode arrangement with the additional DC electrode assembly 410 and DC pad array 460. A plurality of RF electrodes, for each upper and lower RF electrodes 422, 424, four (4) in the case presented here, are extending along the entire length of cryogenic ion trap 400, but may also be segmented, similar to the DC side barriers 412, 414, to have individual RF electrodes along the z-axis to allow an application of different DC bias voltages to the individual RF electrode segments.

Figure 12D:
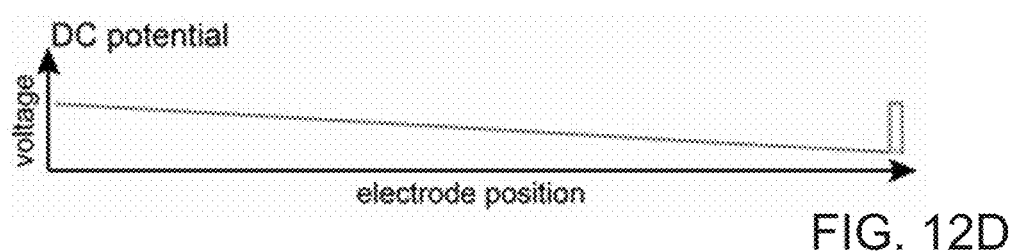

On one PCB surface at least two RF electrodes must be arranged, each of which carries a RF alternating electric potential with a 180° phase shift with respect to the neighboring RF electrode in addition to a superimposed DC bias voltage. The width of an RF electrode is approximately equal to the distance to the next RF electrode. The DC electrode assembly 410 can have DC electrodes 412, 414 arranged at each side of channel 430 and transversally arranged to the RF electrodes 422, 424, and each one of the DC electrodes 412, 414 can have a plurality of DC electrodes segments, to define a specific electric DC side-barrier potential profile along the z-axis of the ion channel of trap 400. Additionally, a DC pad array 460 can be interspersed between the longitudinally extending RF electrodes 422, 424 to define a specific DC potential profile along the ion channel 430 in the z-direction, as illustrated in FIG. 12D. In the exemplary embodiment represented in FIG. 12C the DC pad array 460 is composed of an exemplary number of fifty-one pads (51) arranged in three (3) rows along the z-axis, the exemplary three (3) pads for each one of the fifty-one (51) columns arranged along the x-axis electrically interconnected to each other, thereby configured to define the DC voltage potential gradient or profile along the z-axis of the trap, each one of the three (3) rows arranged to be in-between two longitudinally extending RF electrodes. Individual columns of electrodes from this DC pad array 360 can be used to apply a DC voltage potential gradient or profile as a blocking potential while ions are being trapped as indicated on the rightmost side of FIG. 12D. The individual DC electrode pads of pad array 460 are configured to be interconnected in groups of three (3) interspersed electrode pads, each group individually supplied with a voltage potential, for example from power source 570, and are each electrically insulated or separated from each other. The DC voltage potential profile applied to pad array 460 can cause displacement of the ion cloud along the z-axis and therefore can ensure that trapped ions move toward the exit of trap 400.

The individual DC side barrier electrode segments of DC electrode assembly 410 create an equipotential surface on either side of the ion path along the z-axis. A DC potential gradient with a similar progression to the one applied to the pad electrodes in the DC pad array 460 can be applied to the DC side barrier segments of the DC electrode assembly 410 over the length of the trap in a first iteration, albeit with an offset of a few volts with respect to the DC voltage of the DC pads of pad array 460 to ensure confinement of ions along the x-axis. The DC voltage of each segment of the DC side barrier electrodes 412, 414, is then dynamically adjusted to control the tagging of ions as explained above. The number of side barrier segments required depends on the DC potential gradient applied over the entire trap length. Preferably, at least one pair of side barrier segments per 5 V potential gradient applied to the DC pad array 460 from entrance to exit of the trap 400 can be chosen. If the RF electrode assembly 420 is also chosen to be segmented, preferably into similar sized segments as compared to the segments of the DC electrode assembly 410, then the DC bias potential of an RF voltage applied to the individual RF electrode segments should follow a similar DC potential gradient to the ones applied to the DC pads of pad array 460 and the DC side barriers of DC electrode assembly 410.

The ratio between the width as the extension in x-direction as referenced in FIGS. 12A and 12B of the ion path and the separation between the plates or PCBs expressed as an extension or height in y-direction should not be smaller than 1/1. A compromise between maximized trapping volume, confinement on the x-y plane for optimum overlap with a laser beam, and the effect of the DC side barrier potential from electrodes 412, 414 as further discussed below can thereby be met. In an exemplary and non-limiting embodiment, the PCB separation was 5 mm, the width was approximately 10 mm, and the trap length was approximately 100 mm.

Figure 13A:
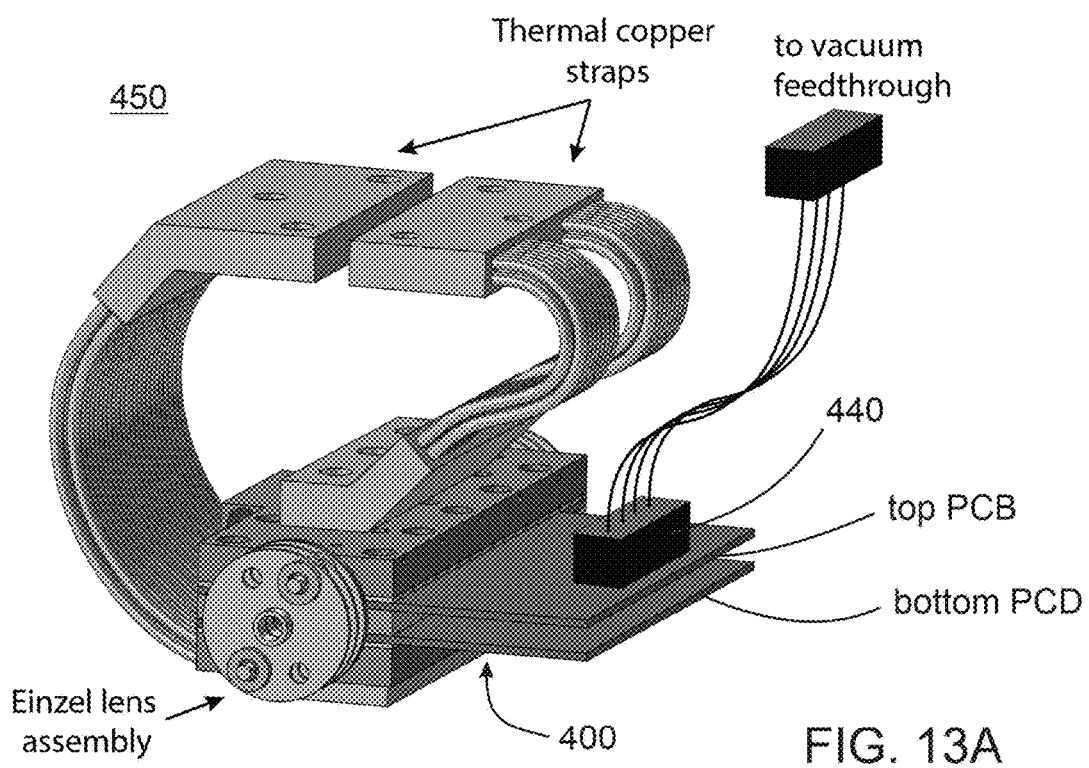
FIGS. 13A and 13B show different aspects of cryogenic ion trap 400 and a cryogenic ion trap assembly in a perspective view, with FIG. 13A showing a ion trap assembly 450, with Einzel-lens assembly for incoming and outgoing ions, and having thermal copper straps for thermal contact with a cold head for cryogenic cooling of the ion trap, and electrical connection from the trap PCBs to a vacuum feedthrough to deliver the electrical potentials to the trap electrodes, and FIG. 13B showing a perspective and exploded view of a possible implementation of the cryogenic ion trap 400 having the DC electrode assembly 410 as segmented side barrier electrodes 412, 414.
Figure 13B:
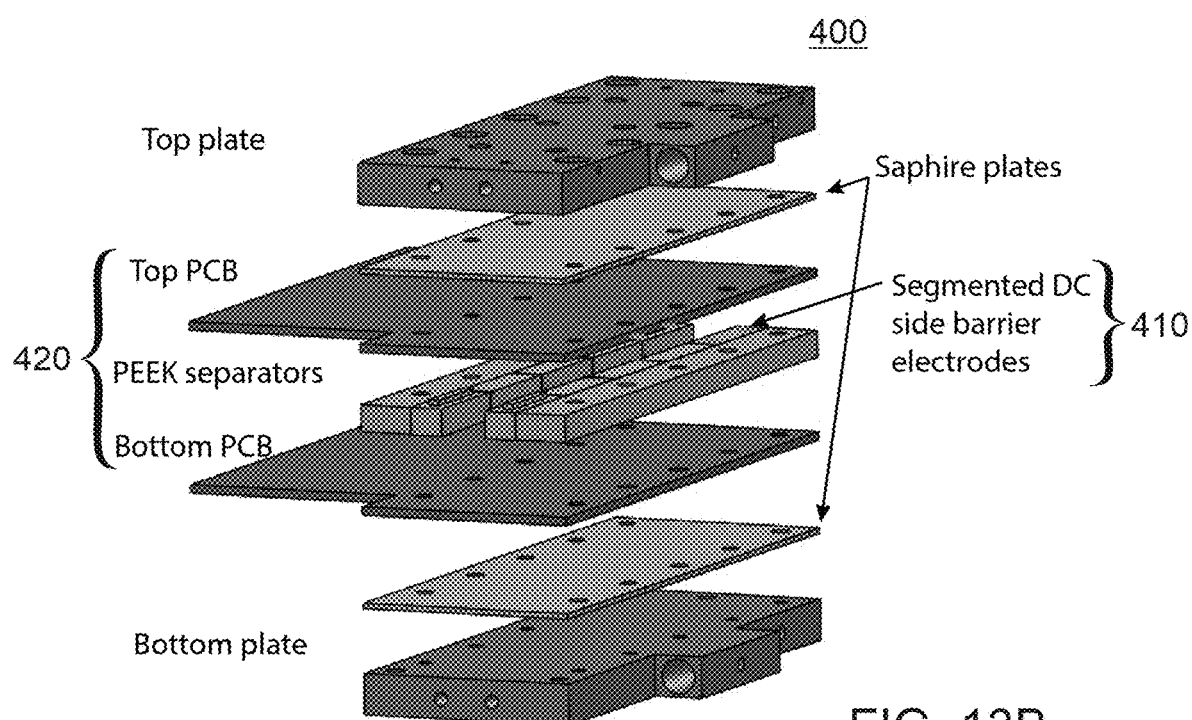

FIGS. 13A and 13B provide for a perspective and schematic views of an exemplary ion trap assembly 450 and ion trap 400, according to another aspect of the present invention, including an Einzel lens mounted at both the entrance and the exit of the trap 400, as shown in FIG. 13A. So-called thermal copper straps can be attached to both the top and bottom of the trap assembly of the ion trap 400, and the ends of these thermal straps are attached to the heat sink (i.e. cryostat) for cooling of the trap inside the vacuum. An exploded view of ion trap 400 is shown in FIG. 13B in an exemplary perspective exploded view, showing the ion trap 400 in a layered or sandwich construction using PCBs or other types of plates with conductive elements for the RF electrode assembly 420 and the electric interconnection to a power source 470. In this variant, the central DC side barrier electrodes that form DC electrodes 412, 414 of the DC electrode assembly 410 can be attached to a mounting aid made from insulating PEEK material. Also, the individual DC electrode segments of assembly 410 can be electrically interconnected to either the top, bottom or both PCBs for electrical interconnection to a power source 570. This is achieved in this variant by physical contact of the DC side barrier segments with dedicated electrodes on the PCBs. Electrical interconnection to the power source 570 is then established through the PCB, together with the connection of all other types of electrodes. The PCBs or plates forming the RF electrode assembly 420 extend to one side of the assembly to allow additional space for the electrical connections to deliver the required electric potentials. These electrical connections can be established using surface-mount or other types of PCB connectors 440, which are schematically shown in FIG. 13A. A wire-assembly with compatible plugs then connects the PCBs to the vacuum feedthroughs of the instrument, and from there the connections to the controller 560, power source, 570 and computing device 550 can be made. A pair of electrically insulating sapphire plates establish a thermal contact between the top and bottom PCBs of the RF electrode assembly 420, and the top- and bottom most copper plates and therefore establish cooling of top and bottom PCBs and the DC electrode assembly 410.

Figure 14A:
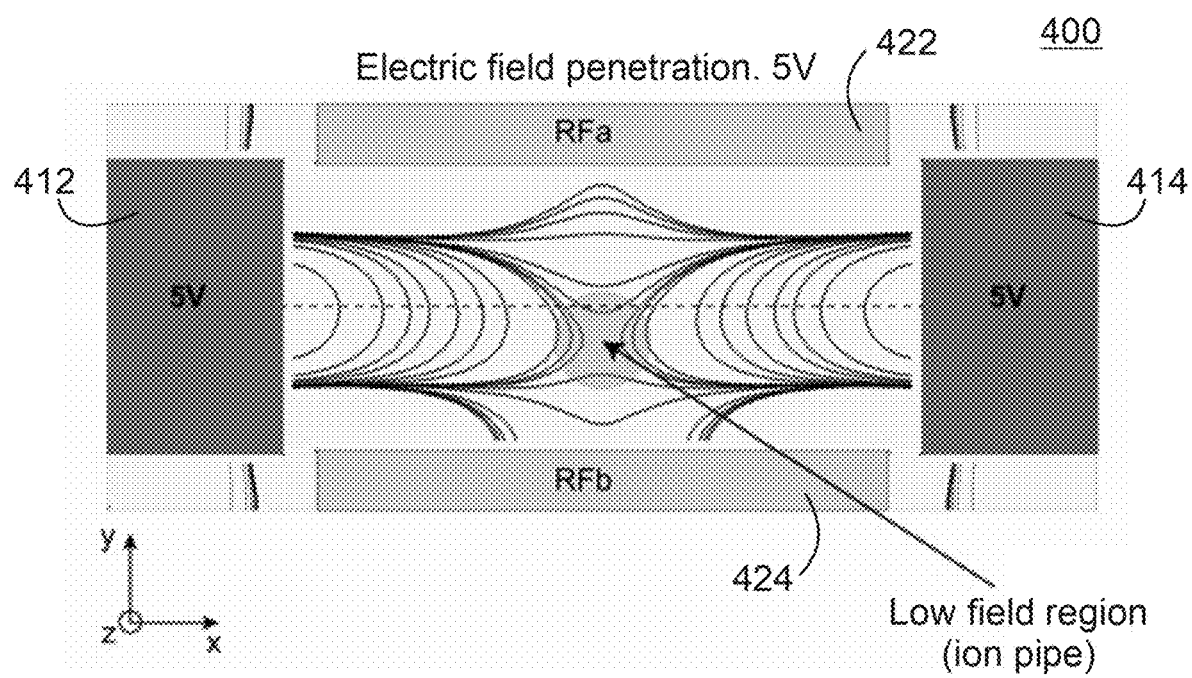
FIGS. 14A and 14B showing two different cross-sectional frontal views of the cryogenic ion trap 400 at two different operational states, with FIG. 14A showing a frontal view of the ion trap 400 with schematic representation of the electric field, at one instant in time, generated by the DC side barrier electrodes 412, 414 showing the effect of the DC potential on the effective low-field region where ions reside for 5 VDC (A), and FIG. 14B showing the same with a DC potential at 10 VDC applied.
Figure 14B:
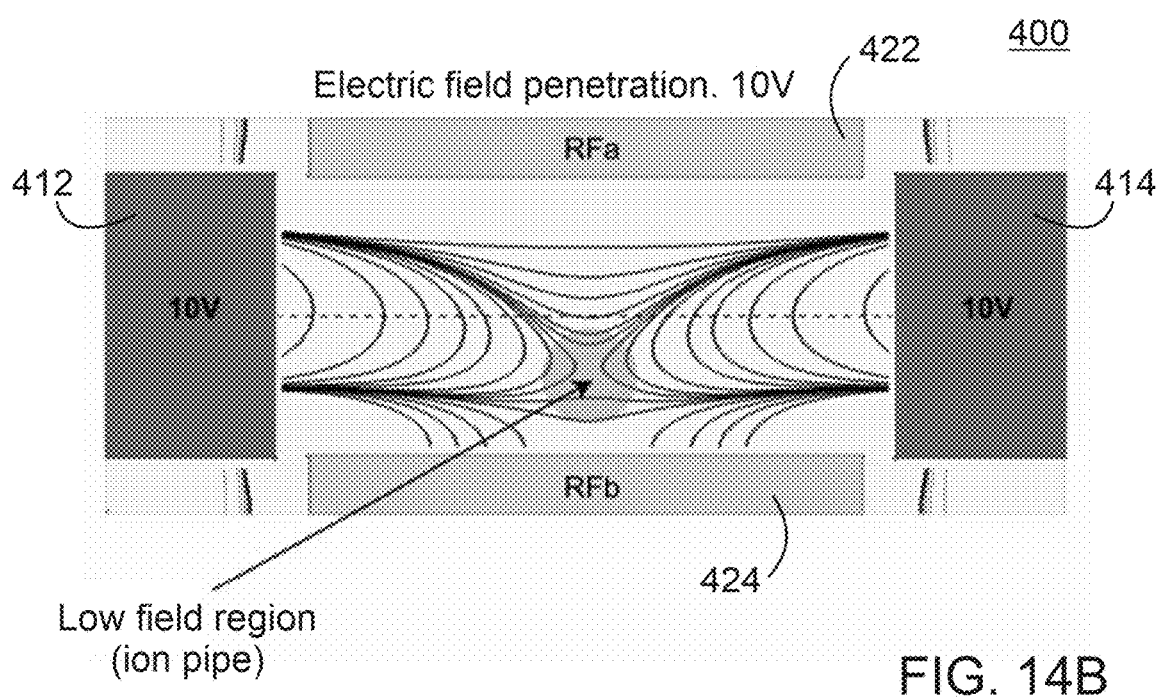

Next, the principle of operation of the DC electrode assembly 410 within the cryogenic ion trap 400 is explained, with the illustrations of FIGS. 14A and 14B. At a given electric potential, the electric field generated by the DC electrodes 412, 414 penetrates the center of the trap, and together with the field from the RF alternating electric potentials of the RF electrode assembly 420 creates a low-field region that displaces an ion cloud from the center of the trap and toward the RF electrodes 422, 424 on the surface of the PCBs. This effect is exemplarily shown in FIG. 14A for one moment in time where the RF potentials are at their maxima. Averaged over time, ions are displaced from the center equally toward the top as they are toward the bottom PCB. The effect is more pronounced the higher the DC potential of the side barrier electrodes, which can be seen when comparing the representation of FIGS. 14A and 14B, where the vertical displacement for a 5 V barrier potential and that generated by a 10 V barrier potential are displayed (qualitatively). Therefore, controlling the DC potential applied to the DC electrodes 412, 414 of the DC electrode assembly 410 effectively controls the position of the trapped ion ensemble relative to the RF electrodes 422, 424. This, in turn, directly influences the amount of RF heating introduced into the ion ensemble, because proximity to the RF electrodes increases the average amplitude of the fast oscillatory motion of the ions and therefore the average kinetic energy, and with that the frequency of energetic collisions, which lead to an increase in internal vibrational energy of an ion. This means that controlling the RF heating effect can directly control the average number of messenger tags attached to ions inside of a cryogenic ion trap.

Next, a method to perform controlled messenger tagging of molecular ions is provided, according to still another aspect of the present invention, by using a cryogenic ion trap 400 as shown above. First, the method can include a step where operating conditions are established to trap, cool, and tag the incoming ions from the ion source 510. This step can include either a gas pulse before ions arrive at cryogenic ion trap 400 or a continuous gas flow of a pure gas or of a gas mixture to optimize the cooling, both in terms of kinetic energy and internal vibrational energy, and tagging of the ions.

Next, a step of applying a blocking DC potential to the DC pad array 460 is performed, for example to one or more groups of the three (3) rows of interconnected electrode pads of the DC pad array 460, to prevent ions from exiting cryogenic ion trap 400. FIG. 12D illustrates this blocking DC potential, where a DC voltage potential gradient or profile is applied to the DC pad array 460 over the length of the ion trap in a direction of extension of the channel or path 430, in the exemplary variant having fifty-one (51) different voltage levels with the fifty-one (51) different columns along the z-axis, to establish the DC voltage potential gradient or profile. Ions are then released towards a detection region by lowering the blocking DC potential of the DC pad array to a DC level similar to that of the neighboring electrodes to analyze their mass-to-charge ratios with a mass spectrometer 530 and computing device 550, for example, using a time-of-flight mass spectrometer and a data processing device, where tagged and untagged ions can be observed. This step is basically a pre-m/z scan. In the next step, the tagging yield, or degree of tagging, is then evaluated by observing the signals in the mass spectrum provided by MS 530 or by an algorithm running on the computing device 550. Action can then be taken when the tagging yield is different from a pre-defined value, while the tagging yield is defined as in Equation (1) above. For example, when the observed tagging yield has a value of 0.8 while the pre-defined tagging yield is set to 0.5, the algorithm can increase the electrical potential of the DC side barriers of the DC electrode assembly 410 with respect to the DC bias of the remaining trap electrodes and observes and re-evaluates the effect on the resulting tagging yield in a subsequently acquired mass spectrum with MS 530. Contrary, if the observed tagging yield is lower than the pre-defined value, the algorithm can instruct a decrease of the electric potential of the DC side barriers of the DC electrode assembly 410. The method of tagging control is successfully completed when the observed tagging yield is satisfactory, i.e. within pre-defined limits around the desired value, for example a pre-stored value stored in a memory of computing device 550. After completion, a laser wavelength scan can be started to perform a tagging-spectroscopic scheme, during which the trapping, tagging, and DC side barrier conditions remain unchanged. During the steps of the tagging-spectroscopic method, the wavelength of the irradiating laser is scanned and the wavelength-dependent tagging yield as defined in Equation (1) is monitored and recorded using the mass spectra that are continuously acquired during the wavelength scan. The tagging yield as a function of laser wavelength represents the absorption spectrum of the investigated ions.

Figure 15A:
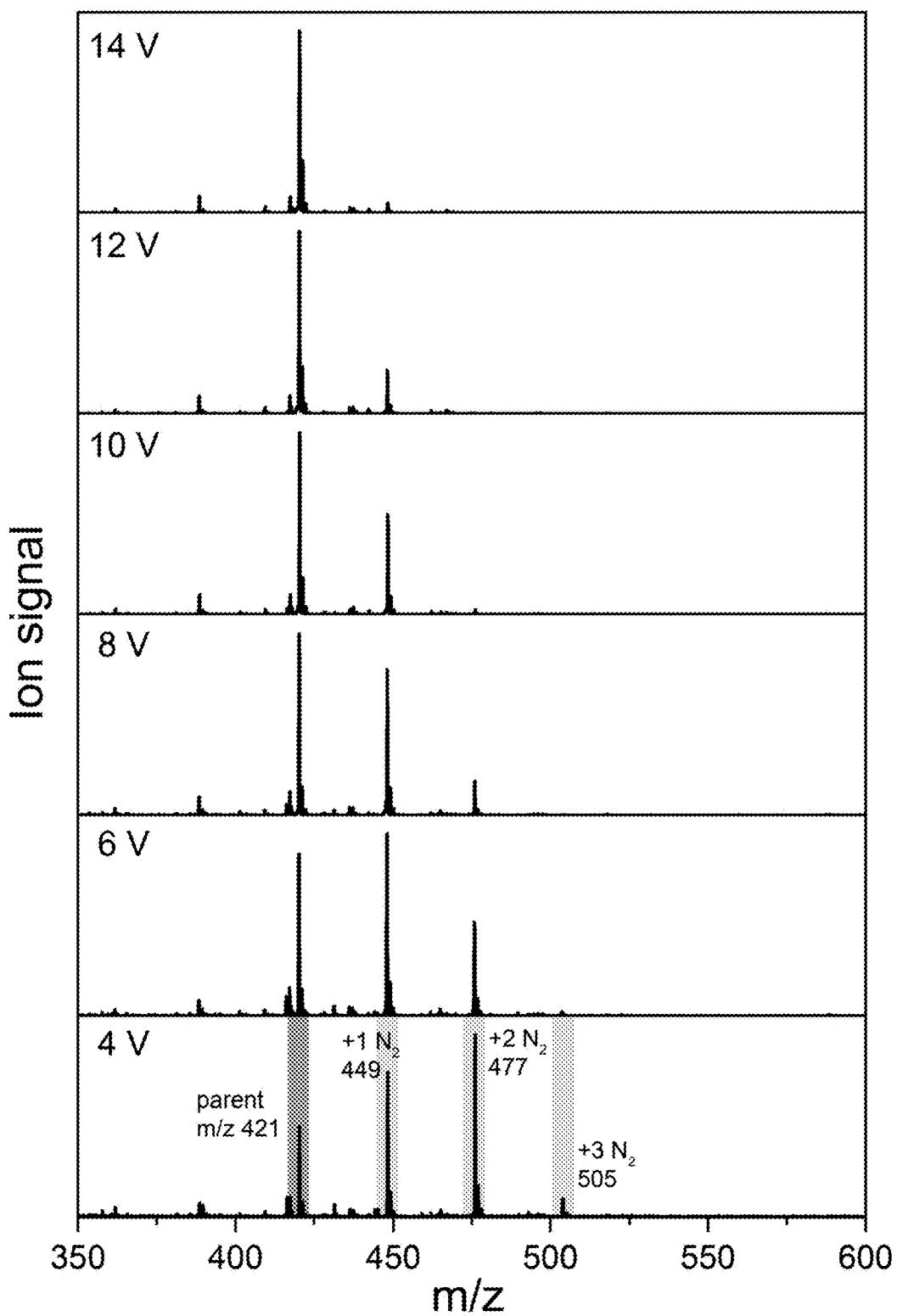
Figure 15B:
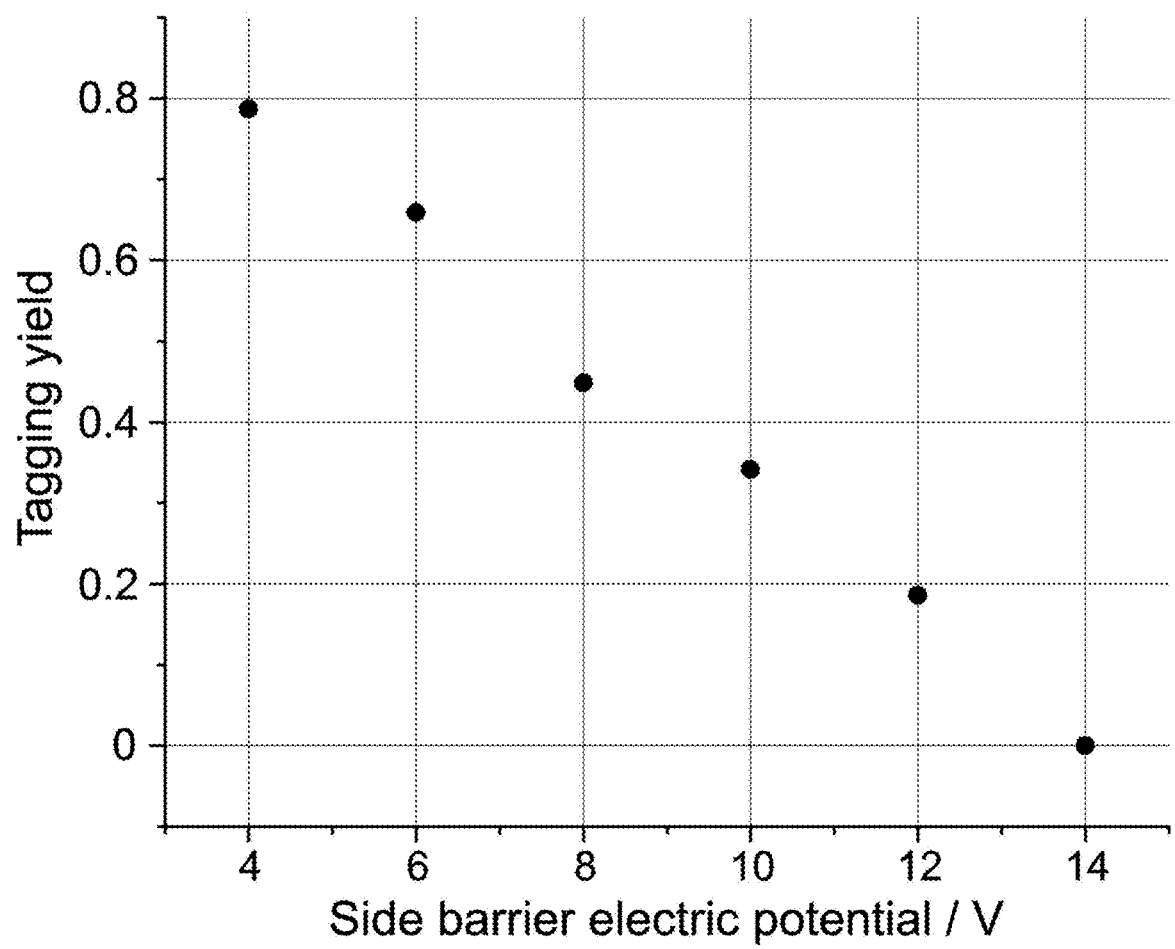

Experimental tests have been performed to validate the performance of the messenger tagging control with the herein presented ion trap 400, system or device 500, and method of operating the same, as shown in FIGS. 15A and 15B. Time-of-flight mass spectra of singly sodiated disaccharide molecular ions after release from a cryogenic ion trap 400 as exemplarily shown in FIGS. 13A and 13B. The DC voltage potential of electrodes 412, 414 of the DC electrode assembly 410, and therefore the 'tagging-control parameter', was varied from 4 V (bottom) to 14 V (top) with respect to the DC bias voltage of the RF electrodes 422, 424 while all other parameters such as the trap and buffer gas temperature (55 K), pressures, and gas flow were held constant. In addition to the bare, untagged ion (m/z 421), signals indicating multiply tagged disaccharide ions can be observed, which decrease in intensity as the tagging-control parameter is increased. FIG. 15B displays the tagging yield determined from the mass spectra following Equation (1) as a function of the DC potential on electrodes 412, 414 of the DC electrode assembly 410. A nearly linear dependency can be observed in the case investigated here. This exemplary data suggests the functionality of this novel means to intentionally induce RF heating in a controlled way in the context of messenger-tagging spectroscopy. For the example of the disaccharide presented in FIG. 15A, It is preferable to choose a DC voltage difference between electrodes 412, 414 and the neighboring RF electrodes 422, 424, and DC pad array electrodes 460 as a tagging-control voltage in the range of 8 V to 10 V, to obtain reproducible IR spectra and to increase signal-to-noise in the measured spectra while minimizing the influence of multiply tagged species on the IR spectrum. Depending on the molecule in question, the observed tagging can be more sensitive to the tagging-control voltage. For example, a change in control voltage of 100 mV can already induce a noticeable change in the observed tagging. Preferably, the DC potential applied to the DC side barrier segments 412, 414 should be in the range of 0.1 V to 50 V with respect to the DC bias voltage of neighboring RF electrodes 422, 424 and those applied to the DC pad array 460.

According to another aspect of the present invention, a method of tagging-control can be performed, where the tagging-control parameter can be adapted automatically by an algorithm running on the computing device 550 before a laser scan is started by the laser device 580. The control voltage must be constant while the spectrum is acquired. Once a new molecule is loaded into the cryogenic ion trap 400, the algorithm evaluates the TOF mass spectra with MS 530 and computing device 550 for the degree of tagging and dynamically adapts the tagging control parameter, i.e. the voltage level applied to segments in the DC electrode assembly 410 to fix the observed tagging yield to a pre-defined value.

In an alternative embodiment of the tagging control method, the DC bias voltage of the RF electrodes 422, 424 with respect to the fixed DC voltage of the DC side barrier segments 412, 414 and the DC bias voltage of the DC pad array 460 can be used as a tagging control parameter in the same way as discussed above. The same method for m/z pre-scan and algorithm-controlled DC voltage adjustment to achieve pre-defined tagging yield applies.

Other alternative embodiments for cryogenic ion trap 400 using a different arrangement and geometry of the RF electrode assembly 420 and DC electrode assembly 410 can be used, where an RF heating effect can also be introduced in a controlled manner by changing the DC bias offset of the RF electrodes, relative to the DC bias voltages of the remaining trap electrodes. In doing so, ions can be driven toward the RF electrodes, which will lead to the desired effect. Other geometries that allow implementation of tagging control are also possible. The approach of controlled, DC-field induced RF heating is not limited to ion trap geometries of the ion traps 400 described above with respect to FIGS. 12A, 12B, 13B, and 16. Any multipole cryogenic ion trap can in principle be modified to allow for tagging control. A classical hexapole geometry featuring two sets of three electrodes each, to which radiofrequency potentials of opposite phase are applied, is displayed in FIG. 16. To allow for controlled RF heating and therefore tagging control, additional electrodes can be introduced parallel to the hexapole electrodes. These DC-only electrodes can then be used to generate an electric field that drives ions towards the RF electrodes a, b where the desired RF heating effect can occur. This can be achieved, for example, by applying a positive voltage, relative to the potential of the RF electrodes, to one half of the tagging-control electrodes while applying a negative relative voltage to the other half as illustrated in the upper section of FIG. 16.

Figure 16:
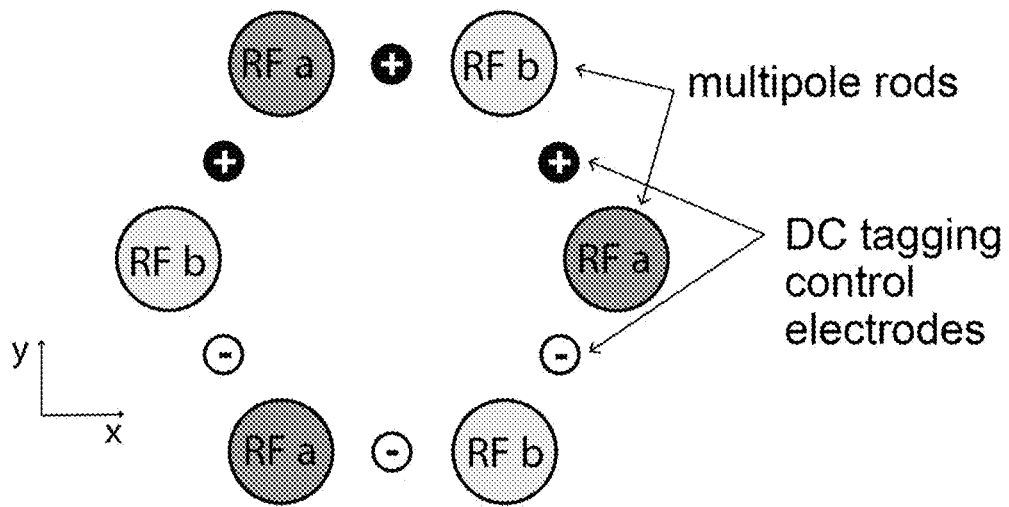
FIG. 16 shows a frontal view in a direction of channel or ion path 430 of an alternative embodiment of a cryogenic ion trap 400 having a DC electrode assembly 410 with six (6) longitudinally extending DC electrodes arranged in a hexapole geometry, and a RF electrode assembly 420 also having six (6) longitudinally-extending RF electrodes, individual DC and RF electrodes alternating each other and circularly arranged around channel 430, and evenly spaced with respect to each other around channel 430.
Figure 16:
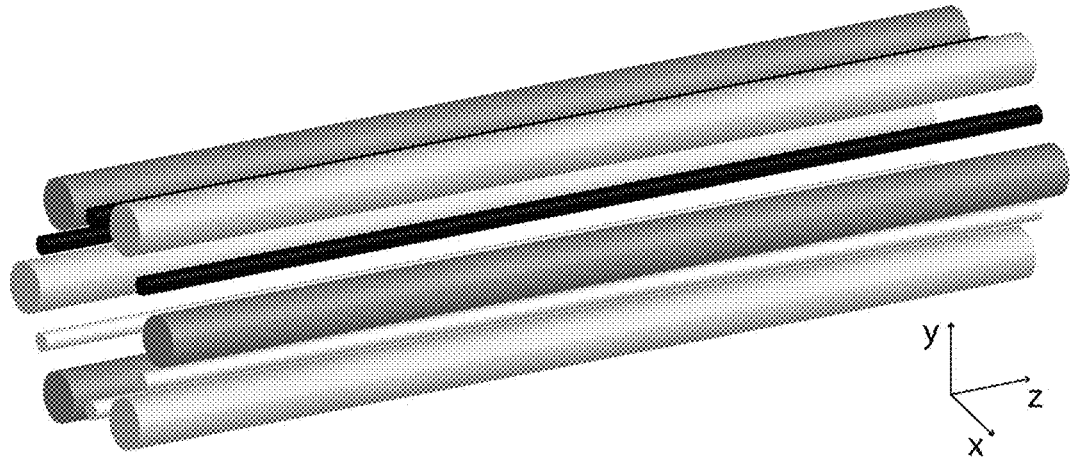

In an alternative embodiment using unmodified multipole ion trap geometries such as the one resulting from removing the DC tagging control electrodes from the hexapole assembly in FIG. 16, a controlled RF induced ion heating effect can be achieved by changing the DC bias potential of one set of RF electrodes (a or b) with respect to the second set of RF electrodes. More generally, the DC bias potential of one or more RF electrodes in a multipole ion trap with respect to the DC bias potential of neighboring RF electrodes can be varied to achieve control of ion tagging. In such cases, the tagging control parameter is represented by this voltage difference between these two sets of RF electrodes and the same methods for tagging control can be applied as the ones described above.

In sum, with the herein presented ion trap 400, system or device 500 including such ion trap 400, and methods of operating the same to achieve a rapid messenger tagging control of ions, in the field of gas-phase ion spectroscopy and more specifically to cryogenic messenger-tagging spectroscopy, it is possible to obtain infrared (IR) vibrational spectra of mass-to-charge selected molecular ions, allowing to easily and quickly control the amount of messenger tags condensed onto a molecular ion inside of a cryogenic ion trap 400, such as a Paul trap or a multipole trap. According to at least some aspects of the present invention, an effect commonly referred to as radiofrequency (RF) heating is used in a controlled way to dynamically influence and adapt the average number of messenger-tagged ions observed in subsequent mass-spectrometric detection.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims.

The invention claimed is:

1. A method for operating a device for fragmenting ions by collision, the method comprising the steps of:
   generating precursor ions with an ionization source, the generated precursor ions to be fragmented by collision to produce fragmented ions;
   causing ion motion of the generated precursor ions with an ion mobility apparatus and performing ion separation of the generated precursor ions in a first separation region of the ion mobility apparatus;
   providing a grid assembly for fragmenting ions by collision comprising first and second conductive grids, and providing a first and second electric potential to the first and second conductive grids, respectively, with an electric power source, the first and second electric potential being different, the grid assembly for fragmenting ions by collision being located between (i) the first separation region of the ion mobility apparatus and (ii) a second separation region of the ion mobility apparatus or a transfer region of the ion mobility apparatus, the second separation region or the transfer region of the ion mobility apparatus being located downstream relative to ion motion from the first separation region and from the grid assembly for fragmenting ions by collision;
   passing separated generated precursor ions from the first separation region of the ion mobility apparatus through the first and second conductive grids, respectively, to accelerate the separated generated precursor ions in a direction of the second separation region or the transfer region and to cause collision induced dissociation of at least some of the separated generated precursor ions to cause fragmented ion parts including fragmented generated precursor ions; and
   causing further ion mobility separation of the fragmented generated precursor ions in the second separation region of the ion mobility apparatus; or transferring, by the transfer region, the fragmented generated precursor ions to the first separation region or to a further separation region of the ion mobility apparatus to carry out further ion mobility separation of the fragmented generated precursor ions; and
   analyzing the separated fragmented generated precursor ions with at least one of a spectrometer or a charge detector,
   wherein the ion mobility apparatus includes at least one first electrode support and at least one second electrode support arranged opposite to each other and having a gap therebetween, each of the first and second electrode support including electrodes on a surface of the electrode support for guiding ions in a channel located between the first and second electrode supports.

2. The method of claim 1, further comprising the step of:
   accumulating the fragmented ion parts in an accumulation region of the ion mobility apparatus, after the step of passing.

3. The method of claim 2, wherein the first electric potential of the first conductive grid is fixed to a DC bias voltage used for the first separation region of the ion mobility apparatus via a first electric connection, and the second electric potential of the second conductive grid is fixed to a DC bias voltage used for the accumulation region of the ion mobility apparatus via a second electric connection.

4. The method of claim 1, wherein in the step of providing, the first electric potential and the second electric potential are provided such that an electric field between the first and second conductive grids exceeds 100 V/cm.

5. A system for fragmenting ions by collision and analyzing the fragmented ions, the system comprising:
   an ionization source configured to generate precursor ions;
   an ion mobility apparatus configured to provide for ion motion and ion separation of the generated precursor ions in a first separation region, and configured to provide for ion motion and ion separation of fragmented generated precursor ions in a second separation region of the ion mobility apparatus or configured to provide for transfer of fragmented generated precursor ions in a transfer region of the planar-ion mobility apparatus to (i) the first separation region for further ion mobility separation of the fragmented generated precursor ions or (ii) a further separation region of the ion mobility apparatus for further ion mobility separation of the fragmented generated precursor ions;
   a grid assembly for fragmenting ions by collision including first and second conductive grids, the grid assembly being located between the first separation region of the ion mobility apparatus and the second separation region or the transfer region of the ion mobility apparatus, the second separation region or the transfer region of the ion mobility apparatus being arranged downstream relative to the ion motion from the first separation region of the ion mobility apparatus and from the grid assembly, the grid assembly being configured to accelerate separated precursor ions, separated in the first separation region, in a direction of the second separation region or the transfer region of the ion mobility apparatus and configured to cause collision induced dissociation of at least some of the separated precursor ions to cause fragmented ion parts including fragmented generated precursor ions; and at least one of a charge detector or a spectrometer for analyzing the fragmented ion parts or a charge detector for detecting charges, wherein the ion mobility apparatus includes at least one first electrode support and at least one second electrode support arranged opposite to each other and having a gap therebetween, each of the first and second electrode support including electrodes on a surface of the electrode support for guiding ions in a channel located between the first and second electrode supports.

6. The system of claim 5, further comprising:

a power source for providing a first electric potential and a second electric potential to the first and second conductive grids, respectively, the first and second electric potentials being different.

7. The system of claim 5, wherein the ion mobility apparatus further includes an accumulation region for accumulating the fragmented ion parts, the accumulation region arranged downstream with respect to the grid assembly.

8. The system of claim 7, wherein the grid assembly includes a first conductive frame for holding the first conductive grid, the first conductive frame having a first window with the first conductive grid arranged therein, and a second conductive frame for holding the second conductive grid, the second conductive frame having a second window with the second conductive grid arranged therein, and wherein the first and second windows are arranged such that an ion transport channel of the planar ion mobility apparatus is unobstructed by the first and second conductive frames, when viewed in a direction of ion motion.

9. The system of claim 6, wherein the grid assembly is affixed to a slot formed between the separation region and the accumulation region of the ion mobility apparatus.

10. The method of claim 1, wherein the ion mobility apparatus is a planar ion mobility apparatus, and the at least one first electrode support includes at least one upper electrode plate and the at least one second electrode support includes at least one lower electrode plate arranged opposite the at least one upper electrode plate and having a gap therebetween, each of the upper and lower electrode plate including electrodes on a surface of the electrode plate for guiding ions in a channel located between the upper and lower electrode plates.

11. The system of claim 5, wherein the ion mobility apparatus is a planar ion mobility apparatus, and the at least one first electrode support includes at least one upper electrode plate and the at least one second electrode support includes at least one lower electrode plate arranged opposite the at least one upper electrode plate and having a gap therebetween, each of the upper and lower electrode plate including electrodes on a surface of the electrode plate for guiding ions in a channel located between the upper and lower electrode plates.

12. The method for operating a device for fragmenting ions by collision according to claim 1, wherein the ion mobility apparatus is a planar ion mobility apparatus.

13. The system for fragmenting ions by collision and analyzing the fragmented ions according to claim 5, wherein the ion mobility apparatus is a planar ion mobility apparatus.

\* \* \* \* \*